US012792002B2

(12) United States Patent
Smith

(10) Patent No.: US 12,792,002 B2
(45) Date of Patent: Nov. 10, 2026

(54) MONITORING AND DISPATCH SYSTEM FOR CONVEYANCE SYSTEMS

(71) Applicant: TK Elevator Innovation and Operations GmbH, Düsseldorf (DE)

(72) Inventor: Rory Stephen Smith, Henderson, NV (US)

(73) Assignee: TK Elevator Innovation and Operations GmbH, Düsseldorf (DE)

( * ) Notice: Subject to any disclaimer, the term of this patent is extended or adjusted under 35 U.S.C. 154(b) by 881 days.

(21) Appl. No.: 18/134,287

(22) Filed: Apr. 13, 2023

(65) Prior Publication Data

US 2024/0345561 A1 Oct. 17, 2024

(51) Int. Cl.
*G05B 15/02* (2006.01)
*G05B 19/4063* (2006.01)

(52) U.S. Cl.
CPC ................................ *G05B 19/4063* (2013.01)

(58) Field of Classification Search
CPC ................................................. G05B 19/4063
USPC ......................................................... 187/393
See application file for complete search history.

(56) References Cited

U.S. PATENT DOCUMENTS

| | | | | |
|---|---|---|---|---|
| 10,981,750 | B2 * | 4/2021 | Song | B66B 5/0025 |
| 2021/0147182 | A1 | 5/2021 | Cheung et al. | |
| 2023/0219785 | A1 * | 7/2023 | Michel | B66B 1/3407 187/247 |

FOREIGN PATENT DOCUMENTS

| | | | |
|---|---|---|---|
| CN | 111170103 | A | 5/2020 |
| CN | 111680621 | A | 9/2020 |
| CN | 112645171 | A | 4/2021 |

* cited by examiner

*Primary Examiner* — Erick D Glass
(74) *Attorney, Agent, or Firm* — Dinsmore & Shohl LLP

(57) ABSTRACT

Embodiments of the present disclosure are directed to a system for monitoring operating conditions of a conveyance system. A primary computing device has a first processing device configured to receive a data indicative of the operating conditions of the conveyance system, determine that an undesirable event is occurring, perform a data analysis using a first algorithm to generate a first analyzed data, determine whether a dispatch request for a physical action is required, and transmit a status data to the at least one secondary computing device. At least one secondary computing device has a second processing device configured to receive the status data, perform a data analysis of the status data using a second algorithm, compare the second analyzed data with the first analyzed data, and transmit the dispatch request to the personal communication device as an alert that the conveyance system requires a physical action of a technician.

20 Claims, 9 Drawing Sheets

MONITORING AND DISPATCH SYSTEM FOR CONVEYANCE SYSTEMS

TECHNICAL FIELD

The present disclosure generally relates to conveyance equipment monitoring and, more particularly, to monitoring and automatically dispatching when service on conveyance equipment is required.

BACKGROUND

Conveyance systems, such as elevators, moving walkways, and escalators, use complex electrical and mechanical components that are subject to wear and failure. While conveyance systems may be monitored remotely for operational issues, these monitoring systems often provide false negatives and false positives. False negatives are where the equipment malfunctions or is trending to a malfunction, but a dispatch is not made to a technician to make the required repairs. False positives occur where the equipment does not need repair, but the technician is dispatched.

SUMMARY

In one embodiment, a system for monitoring operating conditions of a conveyance system is provided. The system includes a primary computing device, at least one secondary computing device and a personal communication device. The primary computing device is communicatively coupled to the conveyance system. The at least one secondary computing device is communicatively coupled to the primary computing device. The personal communication device is communicatively coupled to the at least one secondary computing device. The primary computing device has a first processing device configured to receive a data indicative of the operating conditions of the conveyance system, determine that an undesirable event is occurring based on the received data indicative of the operating conditions of the conveyance system, perform a data analysis using a first algorithm to generate a first analyzed data indicative of the operating conditions of the conveyance system after analysis by the first algorithm, determine whether a dispatch request for a physical action is required, and when the dispatch request for the physical action is required, transmit a status data to the at least one secondary computing device. The at least one secondary computing device has a second processing device configured to receive and store the status data, perform a data analysis of the status data using a second algorithm to generate a second analyzed data indicative of the operating conditions of the conveyance system after analysis by the second algorithm, the second algorithm is different from the first algorithm, compare the second analyzed data with the first analyzed data, and when the comparison between the second analyzed data and the first analyzed data is within a predetermined error value range, transmit the dispatch request to the personal communication device as an alert that the conveyance system requires the physical action and to physically dispatch a technician.

In another embodiment, a method for physically dispatching a technician to a conveyance system is provided. The method includes receiving, by a primary computing device, a data indicative of operating conditions of the conveyance system, determining, by the primary computing device, that an undesirable event is occurring based on the received data indicative of operating conditions of the conveyance system, performing, by the primary computing device, a data analysis using a first algorithm to generate a first analyzed data indicative of operating conditions of the conveyance system after analysis by the first algorithm, and determining, by the primary computing device, whether a dispatch request for a physical action is required. The method continues when the dispatch request for the physical action is required, transmit, by the primary computing device, a status data to at least one secondary computing device, performing, by the at least one secondary computing device, a data analysis of the status data using a second algorithm to generate a second analyzed data indicative of operating conditions of the conveyance system after analysis by the second algorithm, the second algorithm is different from the first algorithm, comparing, by the at least one secondary computing device, the second analyzed data with the first analyzed data, and when the comparison between the second analyzed data and the first analyzed data is within a predetermined error value range, transmit, by the at least one secondary computing device, the dispatch request to a personal communication device as an alert to that the conveyance system requires the physical action and to physically dispatch the technician.

In yet another embodiment, a system for monitoring a plurality of operating conditions for a plurality of components of a conveyance system is provided. The system includes a primary computing device, at least one secondary computing device and a personal communication device. The primary computing device is communicatively coupled to the conveyance system. The at least one secondary computing device is communicatively coupled to the primary computing device. The personal communication device is communicatively coupled to the at least one secondary computing device. The primary computing device is configured to receive a data indicative of operating conditions of the conveyance system, determine that an undesirable event is occurring, perform a data analysis using a first algorithm to generate a first analyzed data, determine whether a dispatch request for a physical action is required, and when the dispatch request for the physical action is required, transmit a status data to the at least one secondary computing device. The at least one secondary computing device configured to receive the status data, perform a data analysis of the status data using a second algorithm to generate a second analyzed data, the second algorithm is different from the first algorithm, compare the second analyzed data with the first analyzed data, and when the comparison between the second analyzed data and the first analyzed data is within a predetermined error value range, transmit the dispatch request to the personal communication device as an alert that the conveyance system requires the physical action and to physically dispatch a technician.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1A:
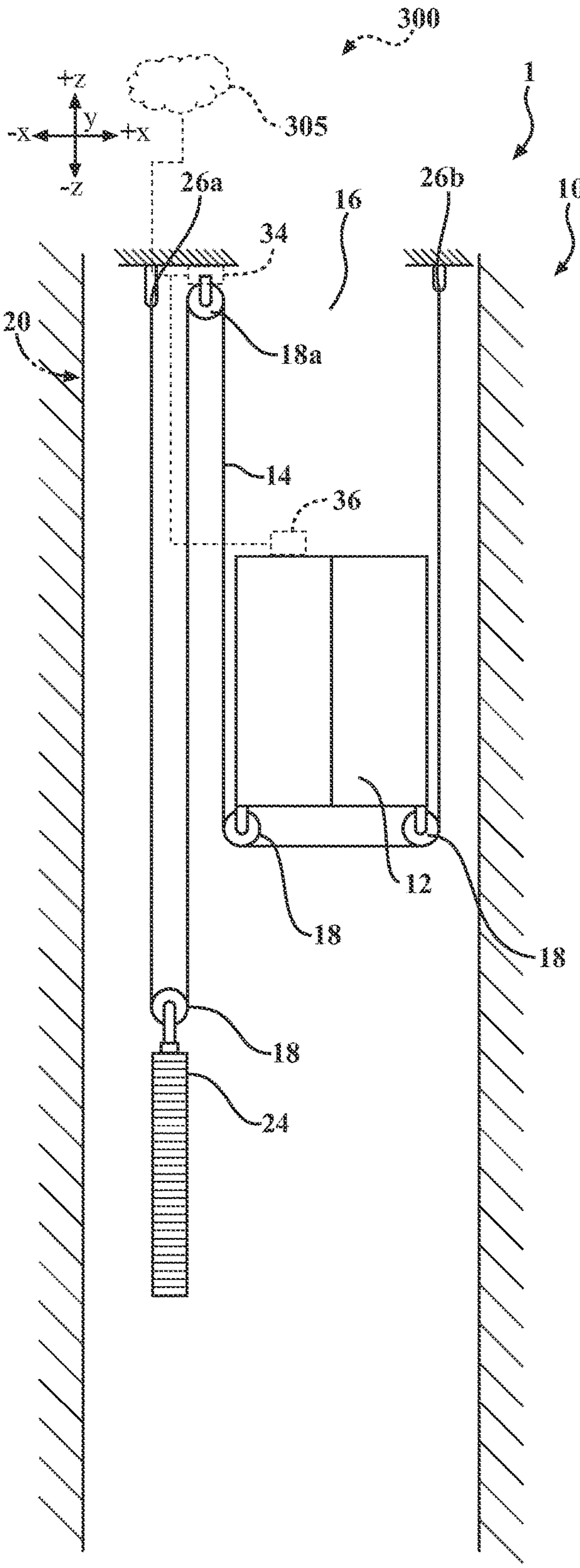
FIG. 1A schematically depicts an example conveyance system with a first aspect of an example elevator assembly schematic, according to one or more embodiments shown and described herein.

Embodiments of the present disclosure are directed to improved systems and methods to monitor and identify whether conveyance equipment requires an automated dispatch to a technician for an actual preventative maintenance or failure of a component of the conveyance equipment. More specifically, the disclosed systems and methods provide an improvement over conventional systems by monitoring data gathered from the conveyance system and analyzing the data with artificial intelligence on a primary computing device for undesirable conditions (i.e., impending failure of components, failure of the conveyance system to operate, and the like), which then issues an automated recommendation to dispatch a technician based on the analyzed data. The request and the data is then analyzed by at least one secondary computing device using different artificial intelligence algorithms than those used by the primary computing device. When the at least one secondary computing device output is within a predetermined range from the determined request of the primary computing device, a technician will be dispatched (e.g., a confirmation that the data is trustful). If the at least one secondary computing device does not recommend a technician be dispatched, then the recommendation is placed on hold and is further evaluated when additional data arrives. Such dispatching is automated and is pushed to a personal communicating device as an alert to notify the technician. In some embodiments, an action recommendation may also be pushed to the personal communication device indicating the most common causes and repairs of the identified undesirable condition.

In some embodiments, the at least one secondary computing device may prioritize requests that are outside of the predetermined range such as when the conveyance system is determined to be a priority use conveyance system (e.g., manufacturing environments, only elevator in a senior center, and the like), the alert may still be pushed to the personal communication device.

As such, the various components described herein may be used to carry out one or more processes to improve the accuracy of determining an undesirable event, or undesirable conditions of the conveyance systems, using at least two different computing devices with at least two different algorithms, and without human intervention, to passively improve the accuracy of automated dispatching technicians to the conveyance systems.

Various systems and methods for monitoring conveyance systems, determination of undesirable events or conditions, and automated dispatching of technicians are described in detail herein.

The phrase "communicatively coupled" is used herein to describe the interconnectivity of various components of the monitoring system for conveyance equipment and means that the components are connected either through wires, optical fibers, or wirelessly such that electrical, optical, data, and/or electromagnetic signals may be exchanged between the components. It should be understood that other means of connecting the various components of the system not specifically described herein are included without departing from the scope of the present disclosure.

The phrase "conveyance system" and "conveyance systems" is used herein to describe the various equipment that is configured to transport or move people, goods, objects, and the like. As examples and without limitation, conveyance systems may be elevator assemblies, such as those with underslung systems, over slung systems, and the like, escalator systems, moving walkway systems, and the like. As such, the phrase "conveyance system(s)" may be interchangeably used for any of these systems.

Referring now to the drawings, FIG. 1A depicts an example conveyance system 1 as an elevator assembly schematic that illustrates various components for a first aspect of an example elevator assembly 10. In this aspect, the example elevator assembly 10 may include an elevator cab 12, a plurality of elevator hoisting members 14 illustrated for schematic reasons as a single suspension member and herein referred to as hoisting members, a hoistway 16 or elevator shaft, a plurality of sheaves 18, an example structure 20 which may include counterweight guide rails, cab guide rails, hoistway walls, mounting brackets, mounting plates, dead-end hitches, rail caps, etc., and a plurality of weights 24 that act as a counterweight to the elevator cab 12. The counterweight 24 moves within the hoistway 16 in the system vertical direction (i.e., in the +/−Z direction). The plurality of elevator hoisting members 14 include a distal end 26*a* and a proximate end 26*b*.

Further, in this aspect, as illustrated and without limitation, the example elevator assembly 10 includes, one sheave that is fixedly mounted to an upper portion of the example structure 20 positioned in an upper portion of the hoistway 16 above the elevator cab 12 in a vertical direction (i.e., in the +/−Z direction), a second sheave that moves with the counterweight 24 as the elevator cab 12 moves between various landings, a third and fourth sheave that are mounted to the elevator cab 12. This is non-limiting, and any number of the plurality of sheaves 18 may be mounted anywhere within the hoistway 16 and there may be more than or less than the four sheaves illustrated as being in the example elevator assembly 10.

At least one of the plurality of sheaves 18 within the hoistway 16 may include a motor such that the sheave 18 is a traction sheave 18*a* capable of driving the plurality of elevator hoisting members 14 through a plurality of lengths between the elevator cab 12 and the traction sheave 18*a*. Further, the plurality of sheaves 18 may further include a plurality of idler sheaves that may also be mounted at various positions in the hoistway 16, and, in this aspect, are also coupled to the elevator cab 12. Idler sheaves are passive (they do not drive the elevator hoisting members 14, but rather guide or route the plurality of elevator hoisting members 14) and form a contact point, or engagement point, with the elevator cab 12. The plurality of elevator hoisting members 14 and the plurality of sheaves 18 move the elevator cab 12 between a plurality of positions within the hoistway 16 including to a plurality of landings. The plurality of sheaves 18 may include any combination of traction type sheaves and idler type sheaves.

The example elevator assembly 10 may further include a plurality of sensors 34 positioned within the hoistway 16, communicatively coupled to various components of the of the example elevator assembly 10, positioned remote or outside of the hoistway 16, and/or the like.

Additionally, the plurality of sensors 34 may be communicatively coupled to the example elevator assembly 10 and may be configured to output a sensor data indicative of general operating conditions of the example elevator assembly 10 such as a temperature of the hoistway 16, positioning of various components of the example elevator assembly 10, and the like. Further, the plurality of sensors 34 may be communicatively coupled to various components of the example elevator assembly 10 and outputs various operating conditions of the various components of the example elevator assembly 10, for example, data related to the plurality of sheaves 18, motors, elevator hoisting members 14, elevator cab 12, and the like. As such, the plurality of sensors 34 may output data used in the remote monitoring of the operation conditions of the example elevator assembly 10 to determine whether the example elevator assembly 10 is currently operating in a desirable condition or whether the example elevator assembly 10 is in an undesirable condition (i.e., not operating due to a failure of a component, electrical signal, and/or the like) or an undesirable event is occurring (i.e., warning signs of an impending failure, degradation of a component, preventative maintenance, and/or the like).

Further, in some embodiments, an acceleration sensor 36 (accelerometer) is coupled to the elevator cab 12. In one aspect, the acceleration sensor 36 (accelerometer) measures the acceleration of the elevator cab 12 within the hoistway 16 and is configured to output a sensor data indicative of the acceleration. This measured value may be double integrated to determine a position of the elevator cab 12 within the hoistway 16 according to the basic equations presented below.

(1) The integral of acceleration over time is change in velocity ($\Delta v=\int a\, dt$).

(2) The integral of velocity over time is change in position ($\Delta s=\int v\, dt$).

In other embodiments, the acceleration sensor 36 (accelerometer) may also be configured to output data indicative vibration signatures of the elevator cab 12. For example, movement may cause vibration, opening/closing of the doors to the elevator cab 12, and the like.

The plurality of sensors 34 and/or the acceleration sensor 36 (accelerometer) may each be communicatively coupled to an elevator controller 315 (FIG. 3) for direct monitoring of the data provided by the plurality of sensors 34 and/or the acceleration sensor 36 (accelerometer) and/or may each be communicatively coupled to a network 305 for remote monitoring, which may include off-site monitoring remote from the hoistway 16, and the like, as discussed in greater detail herein. The elevator controller 315 (FIG. 3) may be communicatively coupled to the network 305 for remote monitoring, which may include off-site monitoring remote from the hoistway 16, and the like, as discussed in greater detail herein.

As illustrated in FIG. 1A, the elevator assembly 10 is an underslung system, with the idler sheaves positioned on a bottom surface of the elevator cab 12. Each of the plurality of elevator hoisting members 14 may be movably coupled to the traction sheave 18*a* and a portion of the plurality of elevator hoisting members 14 may be coupled to the bottom surface of the elevator cab 12 to suspend the elevator cab 12 via the idler sheaves. As such, the elevator hoisting members 14 pass under the elevator cab 12 on a bottom of the elevator cab 12 via the idler sheaves, and are coupled at the top of the hoistway 16 under tension to the example structure 20. For example, the proximate end 26*b* of the plurality of elevator hoisting members 14 may be fixedly coupled to the rail caps and the movably coupled portion of the plurality of elevator hoisting members 14 are under tension to move the elevator cab 12 between various landings.

Figure 1B:
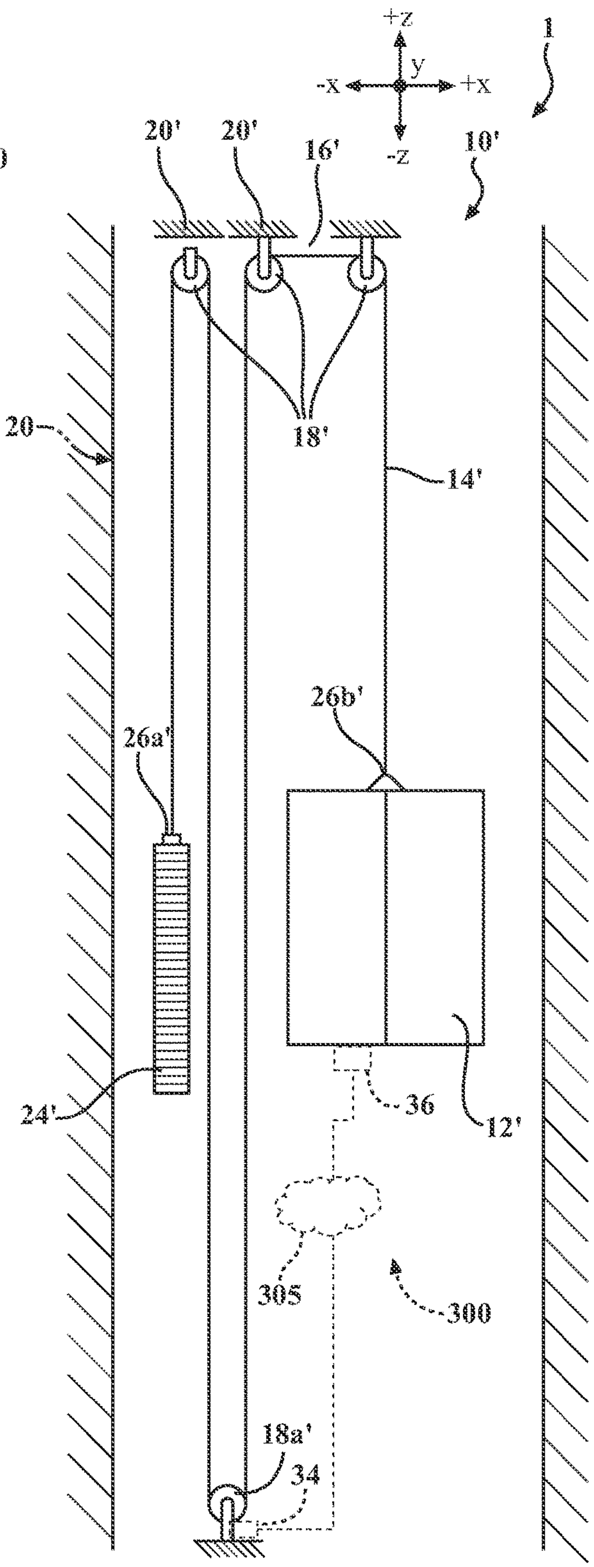
FIG. 1B schematically depicts the example conveyance system of FIG. 1A with a second aspect of an example elevator assembly schematic, according to one or more embodiments shown and described herein.

Referring now to FIG. 1B, another example conveyance system 1 is schematic illustrated as various components for a second aspect of an example elevator assembly 10' is depicted. It should be appreciated that in the discussion herein, the elevator assembly 10, and components thereof, may refer to either elevator assembly 10, 10'. In this aspect, the elevator assembly 10' may include an elevator cab 12', a plurality of elevator hoisting members 14" illustrated for schematic reasons as a single suspension member, a hoistway 16' or elevator shaft, a plurality of sheaves 18', such as traction sheaves and/or idler sheaves, an example grounded structure 20', and a counterweight 24' that move within the example structure 20' in the system vertical direction (i.e., in the +/− Z direction). In this aspect, the plurality of elevator hoisting members 14' extend a length between the counterweight 24' and the elevator cab 12'. Further, in this aspect, at least one of the plurality of sheaves 18' is a traction sheave, which, for example, may be mounted to a lower surface of the hoistway 16'. This is non-limiting, and the traction sheave of the plurality of sheaves 18' may be mounted anywhere within the hoistway 16' and the plurality of sheaves 18' may include a plurality of idler sheaves and at least one traction sheave. It should be appreciated that the traction sheave may include a motor and a brake such that at least one of the plurality of sheaves 18' is a device to drive the plurality of elevator hoisting members 14' through a plurality of lengths with respect to the length between the traction sheave and the contact point of the elevator cab 12'. The idler sheaves may also be mounted at various positions in the hoistway 16' including within the example structure 20'. The idler sheaves are passive (they do not drive the plurality of elevator hoisting members 14' but rather guide or route the plurality of elevator hoisting members 14'). The plurality of elevator hoisting members 14' are coupled to the elevator cab 12' to form the contact point.

Additionally, a plurality of sensors 34' may be communicatively coupled to the example elevator assembly 10' and may be configured to output data as discussed above with respect to the example elevator assembly 10. Further, in some embodiments, an acceleration sensor 36' (accelerometer) is coupled to the elevator cab 12' and is configured to output data as discussed above with respect to the example elevator assembly 10.

The plurality of sensors 34' and/or the acceleration sensor 36' (accelerometer) may each be communicatively coupled to an elevator controller 315 (FIG. 3) for direct monitoring of the data provided by the plurality of sensors 34' and/or the acceleration sensor 36' (accelerometer) and/or may each be communicatively coupled to a network 305 for remote monitoring, which may include off-site monitoring remote from the hoistway 16', and the like, as discussed in greater detail herein. The elevator controller 315 (FIG. 3) may be communicatively coupled to the network 305 for remote monitoring, which may include off-site monitoring remote from the hoistway 16', and the like, as discussed in greater detail herein.

It should be appreciated that the illustrated schematics of FIGS. 1A-1B are merely examples and that the plurality of elevator assemblies are possible, with the plurality of elevator hoisting members 14 routing vary significantly or slightly from these illustrated schematics. For example, there may be several idler sheaves positioned in the hoistway 16 between the traction sheave and the contact point with the elevator cab 12.

Figure 2:
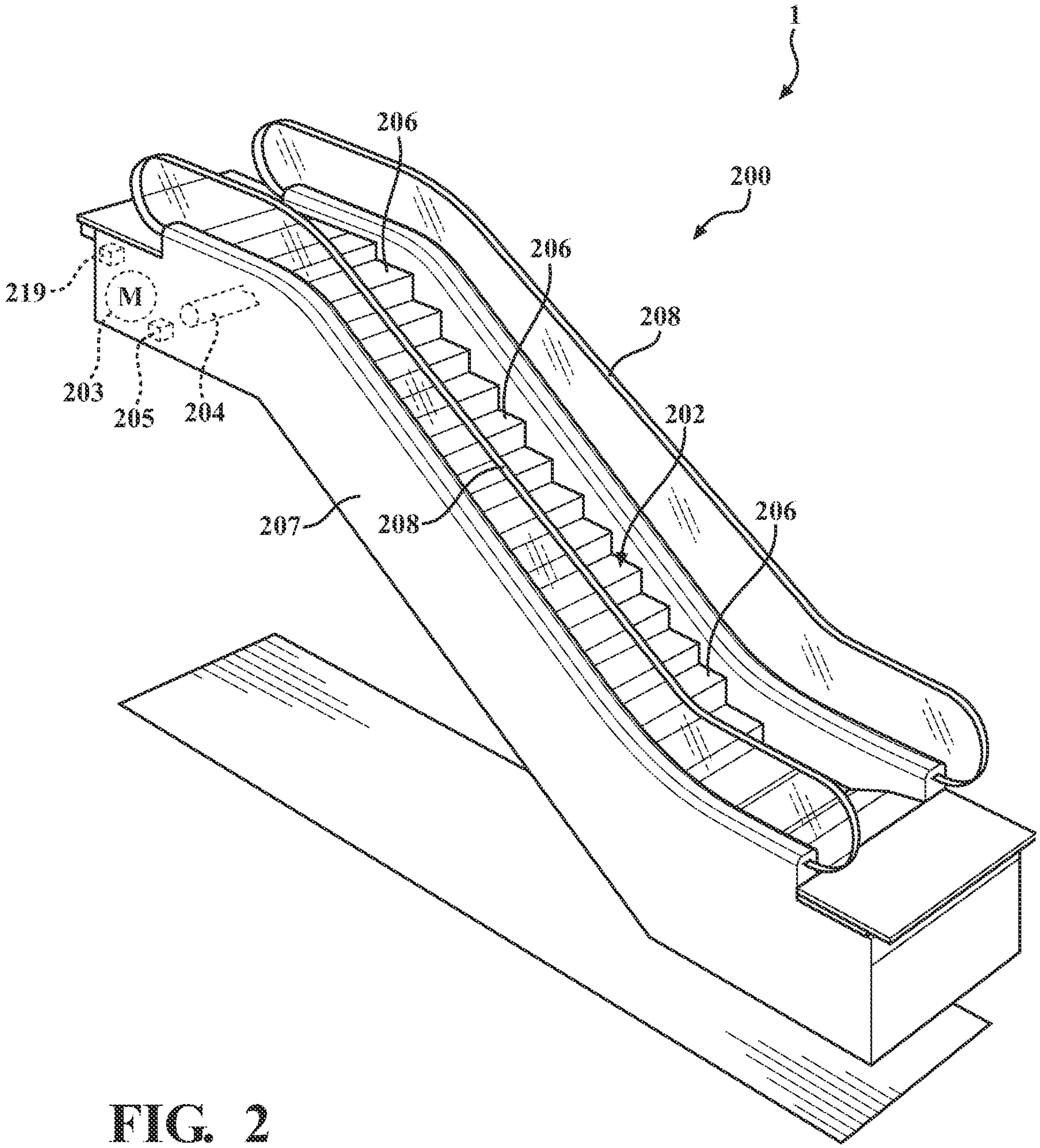
FIG. 2 schematically depicts the example conveyance system of FIG. 1A with an escalator according to one or more embodiments shown and described herein.

Referring now to FIG. 2, another example conveyance system 1 depicted as an example escalator passenger conveyor 200 is schematically depicted. The Example passenger conveyor 200 may include a revolving conveyor belt 202 which is may be a flat belt, or in the example depicted in FIG. 2, as a stepped belt with a plurality of stages 206. Further, the example escalator passenger conveyor 200 may include a straight handrail or, as depicted in FIG. 2, a circumferential handrail 208. The drive components are positioned within a balustrade 207 that may be covered. The example passenger conveyor 200 includes a drive unit illustrated as an electric motor 203 and a drive shaft 204 that is driven by the electric motor 203. It should be understood that may be more than one electric motor and corresponding drive shaft.

Further, the example escalator passenger conveyor 200 includes a control unit 219 a plurality of sensors 205 and may be configured to output the sensor data indicative of general operating conditions of the example escalator passenger conveyor 200 such as current operating conditions, acceleration or rational speed of the revolving conveyor belt 202, desirable and undesirable conditions of each of the components of the example escalator passenger conveyor 200, and the like.

Figure 3:
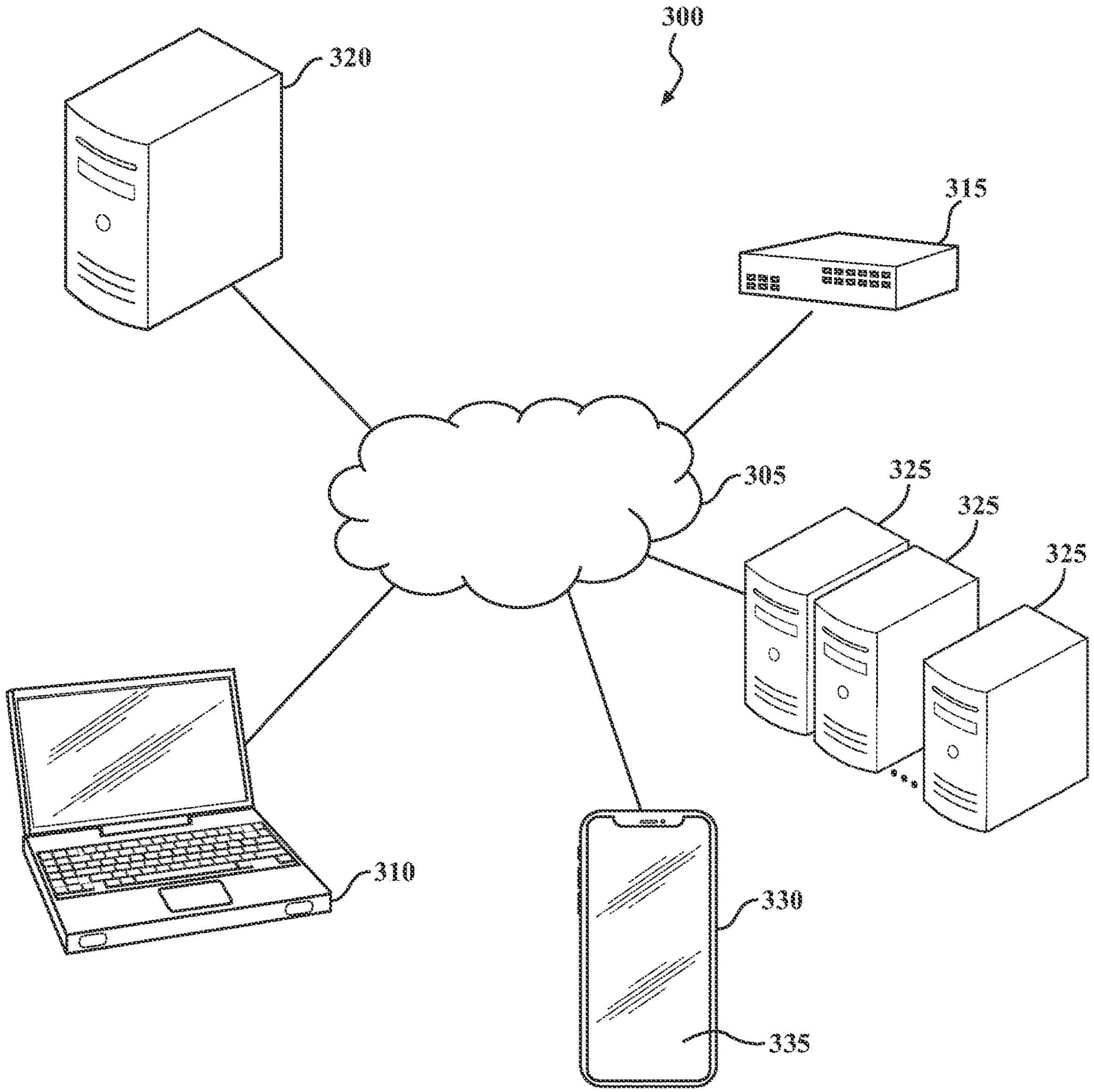
FIG. 3 schematically depicts an illustrative monitoring and dispatching system having components for monitoring the operating conditions of the various components of the example conveyance systems of FIGS. 1A-1B and 2 according to one or more embodiments described and illustrated herein.

The plurality of sensors 205 may each be communicatively coupled to the control unit 219. As used herein, the control unit 219 and the elevator controller 315 depicted in FIG. 3 are interchangeability used and may each be a referred to as controller, electronic control unit, control module, central processing unit, and the like, for direct monitoring of the data provided by the plurality of sensors 205 and/or may be communicatively coupled to the network 305 for remote monitoring, which may include off-site remote monitoring, and the like, as discussed in greater detail herein. The control unit 219 (equivalent to the elevator controller 315 depicted in FIG. 3) may be communicatively coupled to the network 305 for remote monitoring, which may include off-site monitoring remote, as discussed in greater detail herein.

Referring now to FIG. 3, components of an illustrative monitoring and dispatching system 300 configured to monitor the operating condition of the conveyance equipment and components thereof is schematically depicted, according to embodiments shown and described herein.

The illustrative monitoring and dispatching system 300 may generally be configured to communicatively couple one or more computing devices and/or components thereof to the conveyance systems 1 (FIGS. 1A-1B and 2). As illustrated in FIG. 3, illustrative computing devices may include, but are not limited to, an electronic computing device 310, an elevator controller 315, a primary computing device 320, at least one secondary computing device 325, and a personal communication device 330. Further, it should be appreciated that these devices may be local to the example conveyance systems 1 (FIGS. 1A-2), may be remote from the conveyance systems 1 (FIGS. 1A-2), and/or combinations thereof. Further, as discussed above, the elevator controller 315 may be the control unit 219 illustrated in FIG. 2 or any other computing device(s) communicatively coupled to the example conveyance systems 1 (FIGS. 1A-2).

The computer network 305 may include a wide area network (WAN), such as the internet, a local area network (LAN), a mobile communications network, a public service telephone network (PSTN), a personal area network (PAN), a metropolitan area network (MAN), a virtual private network (VPN), and/or another network. Some components of the computer network 305 may be wired to one another using Ethernet (e.g., the primary computing device 320, the at least one secondary computing device 325, and/or the elevator controller 315) or hard wired to one another using conventional techniques known to those skilled in the art.

The components and functionality of the primary computing device 320 and the at least one secondary computing device 325 will be set forth in detail below.

The electronic computing device 310 may generally provide an interface between a user and the other components connected to the monitoring and dispatching system 300. In some embodiments, the electronic computing device 310 may be a user-facing device, such as any personal electronic device. For example, a laptop, mobile phone, tablet, desktop computer, and/or the like, that is positioned remote to the elevator controller 315 and/or the personal communication device 330. In other embodiments, the electronic computing device 310 may be a human machine interface (HMI) or other electronic computing device positioned at and/or communicatively coupled to the elevator controller 315, the primary computing device 320 and/or the at least one secondary computing device 325. The electronic computing device 310 may be used to perform one or more user-facing functions, such as receiving one or more inputs, signals, and/or data from the monitoring and dispatching system 300. The electronic computing device 310 may present a user with a user interface that displays data, permits the user to interact with the data, sets predetermined thresholds and adjusts as necessary, and/or the like, as discussed in greater detail herein.

In some embodiments, the electronic computing device 310 may be configured to provide desired oversight, updating, and/or correction to the elevator controller 315, the primary computing device 320 and/or the at least one secondary computing device 325. The electronic computing device 310 may also be used to connect additional electronic computing devices 310, additional secondary computing devices 325, additional elevator controllers 315, and/or the like, to the network 305 or to other devices of the monitoring and dispatching system 300.

The primary computing device 320 may receive data from one or more sources (e.g., from the plurality of sensors 34, the acceleration sensor 36 (accelerometer), the plurality of sensors 34', the acceleration sensor 36', the plurality of sensors 205, the elevator controller 315, and/or the like), generate data, store data, index data, search data, and/or provide data to the at least one secondary computing device 325 (or components thereof), the personal communication device 330 (or components thereof), the electronic computing device 310 (or components thereof), and/or the elevator controller 315 (or components thereof). In some embodiments, the primary computing device 320 may employ one or more algorithms that are used for the purposes of determining whether the received data is indicative of an undesirable event of the example conveyance systems 1 (FIGS. 1A-2), as discussed in greater detail herein.

For example, undesirable events may be an undesirable operating condition of the example conveyance system 1 (FIGS. 1A-2) such as the example conveyance system 1 (FIGS. 1A-2) not currently operating. Further, the undesirable event of the example conveyance systems 1 (FIGS. 1A-2) may be a failure of a part or component of the example conveyance system 1 (FIGS. 1A-2) that does not stop the example conveyance system 1 (FIGS. 1A-2) from operating and/or a predicted or expected failure when a part or component of the example conveyance system 1 (FIGS. 1A-2) is determined to be in a pre-failure state or an imminent failure state, but has not yet failed. Examples may be wear parts or components, preventative maintenance parts and components, and/or monitoring of these components leads to trends or data that illustrates the need to replace or repair a part or component prior to failure. Other examples may be the actual stopping of operation of the example conveyance system 1 (FIGS. 1A-2) due to failed components, electrical issues, software and/or firmware, and/or the like.

Moreover, the primary computing device 320 may be used to produce data, such as analyzing the data received to determine using artificial intelligence algorithms whether an undesirable event is occurring and whether a technician should be dispatched to the undesirable event. The received data may be from the elevator controller 315, the various sensors (e.g., from the plurality of sensors 34, the acceleration sensor 36, the plurality of sensors 34', the acceleration sensor 36', the plurality of sensors 205, and/or the like), or combinations of data from both the elevator controller 315 and the various sensors (e.g., from the plurality of sensors 34, the acceleration sensor 36, the plurality of sensors 34', the acceleration sensor 36', the plurality of sensors 205, the elevator controller 315, and/or the like). The data received, for example, from the elevator controller 315 may be fault data, raw data from the various sensors (e.g., from the plurality of sensors 34, the acceleration sensor 36, the plurality of sensors 34', the acceleration sensor 36', the plurality of sensors 205, the elevator controller 315, and/or the like) and the like. The data received from the sensors may be raw data. Raw data may be data that is not analyzed and/or a fault message or indicators is not attached to the data.

The primary computing device 320 may be configured to recognize from the received data that the undesirable event has occurred. The primary computing device 320 may then or simultaneously analyze the received data using various artificial intelligence algorithms to determine whether the example conveyance systems 1 (FIGS. 1A-2) needs attention from the technician. Example artificial intelligence algorithms may include, without limitation, neural networks, using pattern recognition, classification algorithms, regression algorithms, clustering algorithms, ensemble learning algorithms and the like. Classification algorithms may include, without limitation, Naive Bayes, decision tree, random forest, logistic regression, support vector machines, K nearest neighbours and the like. Regression algorithms may include, without limitation, linear regression. Clustering algorithms may include, without limitation. K-means clustering.

When the primary computing device 320 determines that the undesirable event has occurred and a request for dispatching the technician is required, the primary computing device 320 transmits the request and the associated data (e.g., raw received data, analyzed data and results, and the like) to the at least one secondary computing device 325, as discussed in greater detail herein. The components and functionality of the primary computing device 320 will be set forth in detail below in FIGS. 4A-4C and the components and functionality of the at least one secondary computing device 325 will be set forth in detail below in FIGS. 5A-5C.

The at least one secondary computing device 325 may be positioned onsite or remote to the example conveyance systems 1 (FIGS. 1A-2) and/or the primary computing device 320. The at least one secondary computing device 325 may receive data from one or more sources (e.g., from the primary computing device 320, the electronic computing device 310, and/or the like), and may generate data, store data, index data, search data, and/or provide data to various components such as to the personal communication device 330. In some embodiments, the at least one secondary computing device 325 may store data from the primary computing device 320 to analyze the data, as discussed in greater detail herein. For example, the at least one secondary computing device receives the request and the associated data from the primary computing device 320, which is then analyzed using different artificial intelligence algorithms than what was used to analyze the data by the primary computing device 320. The data analyzed is the same data that triggers, or otherwise causes the undesirable event, that is provided by either the elevator controller 315 and/or the various sensors (e.g., from the plurality of sensors 34, the acceleration sensor 36, the plurality of sensors 34', the acceleration sensor 36', the plurality of sensors 205, the elevator controller 315, and/or the like) to the primary computing device 320.

As such, because the same data is analyzed by the at least one secondary computing device 325, but with a different artificial intelligence algorithm, a redundant analysis is performed without the need for human intervention. Example artificial intelligence algorithms may include, without limitation, neural networks, using pattern recognition, classification algorithms, regression algorithms, clustering algorithms, ensemble learning algorithms and the like. Classification algorithms may include, without limitation, Naive Bayes, decision tree random forest, logistic regression, support vector machines. K nearest neighbours and the like. Regression algorithms may include, without limitation, linear regression. Clustering algorithms may include, without limitation, K-means clustering.

The at least one secondary computing device 325 compares the result of the analyses of the data to that of the result from the primary computing device. When the results are similar, or within the predetermined error value or margin, or deviation, or difference, or variance, the at least one secondary computing device 325 automatically pushes a notification to the personal communication device 330 to alert the technician of the undesirable event requiring an action by the technician. Further, in some embodiments, an action notification may also be pushed (e.g., automated action without human intervention) to the personal communication device 330 (FIG. 3) including information for the technician regarding the most likely cause of the undesirable event and/or repair recommendations (e.g., instructions, potential components to check, and the like). Further, in some embodiments, depending on the type of undesirable event, the at least one secondary computing device 325 may communicate with the elevator controller 315 to provide an instruction or command for the elevator controller 315 to inhibit further movement of the example conveyance system 1 (FIGS. 1A-2) until the technician can repair the example conveyance system 1 (FIGS. 1A-2).

Still referring to FIGS. 1A-3, the elevator controller 315 provides commands to the traction sheaves **18*a*', actuators of the elevator cab 12 to open or close the doors, and/or the like. Further, the elevator controller 315 may communicate movements, or lack of movements, of the elevator cab 12 (revolving conveyor belt 202) to the primary computing device 320. As such, the elevator controller 315 may receive data from the various sensors (e.g., from the plurality of sensors 34, the acceleration sensor 36, the plurality of sensors 34', the acceleration sensor 36', the plurality of sensors 205, the elevator controller 315, and/or the like), the at least one secondary computing device 325, and/or the like, and control the example conveyance system 1 through sequences of operation and real-time calculations or algorithms based on currently occurring undesirable events or the prediction of an impending undesirable event. As such, the elevator controller 315 may contain the requisite processing device, hardware, software, and/or the like, to perform the functionalities relating to moving the various components of the example conveyance systems 1 (FIGS. 1A-2**) to move people, objects, and goods from one position to another.

Still referring to FIGS. 1A-3, the personal communication device 330 may be a user-facing device, such as any personal electronic device. For example, a laptop, mobile phone, tablet, desktop computer, and/or the like. As such, the personal communication device 330 may include a display 335, a processor, a memory communicatively coupled to the processor, and machine readable instructions stored in the memory. The machine readable instructions may cause the display 335 to, when executed by the processor, launch and operate an alert and/or notification pushed from the at least one secondary computing device 325 to the personal communication device 330, as discussed in greater detail herein. Further, the notification or alert may be both visual on the display 335 and/or audible to gain the attention of the technician.

It should be understood that the illustrative monitoring and dispatching system 300 and components thereof (e.g., the primary computing device 320, the at least one secondary computing device 325, the personal communication device 330, the elevator controller 315, the electronic computing device 310, and/or the like) may gather and transform data for better automatically dispatch technicians to the example conveyance systems 1 (FIGS. 1A-2) by identifying an actual, real-time undesirable event and to reduce false negatives and false positives occurring rather than using conventional techniques such as human intervention, as discussed in greater detail herein. Such techniques improve accuracy of determining undesirable events, determining whether there is an actual need to automatically dispatch the technician due to the undesirable event, and automatically and passively dispatching the technician after it is determined by the primary computing device 320 and the at least one secondary computing device 325, utilizing different artificial intelligence algorithms, that the undesirable event requires the technician to be dispatched, as discussed in greater detail herein.

It should be understood that while the electronic computing device 310 is depicted as a personal computer, the primary computing device 320 is depicted as a server, the at least one secondary computing device 325 is depicted as a server, the personal communication device 330 is depicted as a smart cellular phone, and the elevator controller 315 is depicted as a generic controller, these are merely examples. More specifically, in some embodiments, any type of computing device (e.g., mobile computing device, personal computer, server, and the like) may be utilized for any of these components. Additionally, while each of these computing devices is illustrated in FIG. 3 as a single piece of hardware, this is also an example. More specifically, each of the electronic computing device 310, the primary computing device 320, the at least one secondary computing device 325, the personal communication device 330, and the elevator controller 315 may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-network computing device or a networked computing device that does not use the network to complete the various processes described herein.

Figure 4A:
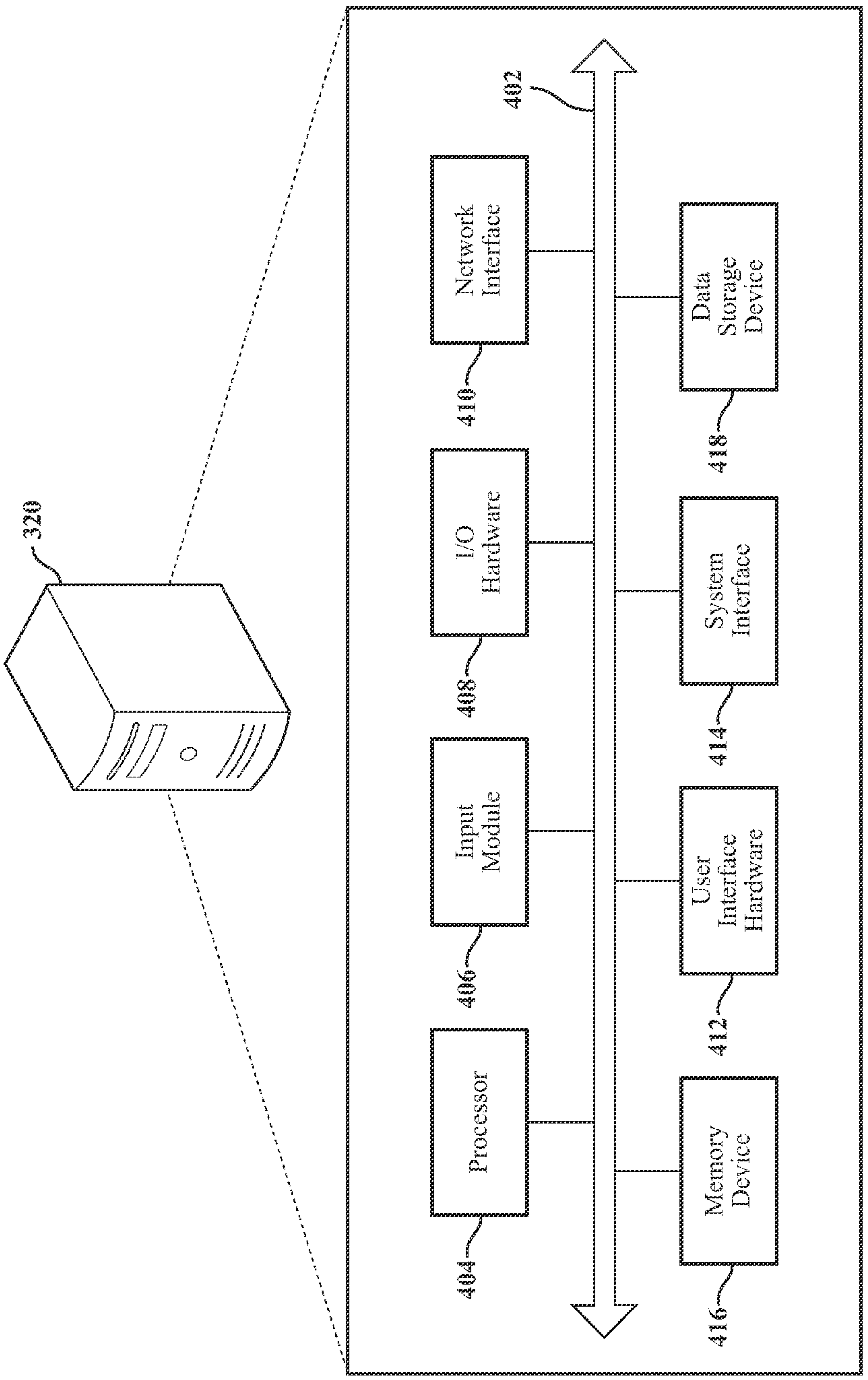
FIG. 4A schematically depicts illustrative hardware and software components of a primary computing device that may be used for determining whether a technician needs to be dispatched according to one or more embodiments described and illustrated herein.

Referring now to FIGS. 1A-3 and 4A, where FIG. 4A depicts the primary computing device 320, further illustrating a system that monitors and identifies the undesirable event and whether a technician needs to be automatically dispatched by utilizing hardware, software, and/or firmware, according to embodiments shown and described herein. The primary computing device 320 may include a non-transitory, computer readable medium configured for receiving raw data from various sources (e.g., directly from the various sensors, from the elevator controller 315, and/or the like), performing the various functions described herein such as those discussed with respect to FIGS. 6-7, providing commands to automatically notify the technician of the undesirable event, providing likely action notifications for repairing the cause of the undesirable event, and/or the like, embodied as hardware, software, and/or firmware, according to embodiments shown and described herein.

While in some embodiments, the primary computing device 320 may be configured as a general purpose computer with the requisite hardware, software, and/or firmware. In other embodiments, the primary computing device 320 may be configured as a special purpose computer designed specifically for performing the functionality described herein. For example, the primary computing device 320 may be a specialized device that particularly receives raw data from the various sensors, fault data from the elevator controller 315, and/or combinations thereof, analyzes and transforms the received data into a first analyzed data by applying machine learning techniques, classifying processes, and/or artificial intelligence algorithms such as neural networks and pattern recognition, to determine whether the undesirable event occurred (is occurring) and/or whether a technician is required to respond to correct the undesirable event, and automatically, in an automated process, output a request for the technician, the raw data as received, and the first analyzed data (e.g., the analyzed and transformed raw data into the first analyzed data) for comparison by the at least one secondary computing device 325 (FIG. 3), as discussed in greater detail herein.

As such, the primary computing device 320 provides, transmits, and/or outputs a status data which may include data for the dispatch request, the first analyzed data, and the data indicative of the operating conditions of the example conveyance system 1 (FIGS. 1A-2), for comparison to an external component (e.g., the at least one secondary computing device 325 (FIG. 3)) for the purposes of improving the accuracy of passively monitoring the conveyance system 1 (FIGS. 1-2A), recognizing the undesirable event, and determining whether the notification should be transmitted to another external device (e.g., the personal communication device 330 (FIG. 3)).

As also illustrated in FIG. 4A, in other embodiments, the primary computing device 320 may include a processor 404, input module 406. I/O hardware 408, network interface hardware 410, user interface hardware 412, a system interface 414, a data storage device 418, which stores a database of elevator controller data 430, sensor data 432, secondary computing devices data 434, first analysis data 436, and first analysis algorithm data 438, and a memory device 416. The memory device 416 may be non-transitory computer readable memory. The memory device 416 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory device 416 may be configured to store operating logic 420, first analysis algorithm logic 422, undesirable event recognition logic 424, and request data transfer logic 426 (each of which may be embodied as a computer program, firmware, or hardware, as an example). A local interface 402 is also included in FIG. 4A and may be implemented as a bus or other interface to facilitate communication among the components of the primary computing device 320.

The processor 404, such as a computer processing unit (CPU), may be the central processing unit of the primary computing device 320, performing calculations and logic operations to execute a program. The processor 404, alone or in conjunction with the other components, is an illustrative processing device, computing device, electronic control unit, or combination thereof. The processor 404 may include any processing component configured to receive and execute instructions (such as from the data storage device 418 and/or the memory device 416).

Still referring to FIG. 4A, the input module 406 may include tactile input hardware (i.e. a joystick, a keyboard, a mouse, a knob, a lever, a button, and/or the like) that allows the user to directly input settings. The I/O hardware 408 may communicate information between the local interface 402 and one or more other components of the illustrative monitoring and dispatching system 300 (FIG. 3). For example, the I/O hardware 408 may act as an interface between the primary computing device 320 and other components, such as the electronic computing device 310, the at least one secondary computing device 325, and/or the like. In some embodiments, the I/O) hardware 408 may be utilized to transmit one or more commands to the other components of the illustrative monitoring and dispatching system 300 (FIG. 3).

Still referring to FIG. 4A, the network interface hardware 410 may include any wired or wireless networking hardware, such as a modem, a LAN port, a wireless fidelity (Wi-Fi) card. WiMax4 card, mobile communications hardware, and/or other hardware for communicating with other networks and/or devices. For example, the network interface hardware 410 may provide a communications link between the primary computing device 320 and the other components of the illustrative monitoring and dispatching system 300 (FIG. 3) depicted in FIG. 3, including, but not limited to, the electronic computing device 310, the elevator controller 315, the at least one secondary computing device 325, and/or the like, as depicted in FIG. 3.

The user interface hardware 412 may permit information from the local interface 402 to be provided to the user, whether the user is local to the primary computing device 320 or remote from the primary computing device 320 (e.g., a user of the electronic computing device 310 (FIG. 3)). Still referring to FIG. 4A, the user interface hardware 412 may incorporate a display and/or one or more input devices such that information is displayed on the display in audio, visual, graphic, or alphanumeric format and/or receive inputs. Illustrative input devices include, but are not limited to, the devices discussed with respect to the input module 406, a keyboard, a touch screen, a remote control, a pointing device, a video input device, an audio input device, a haptic feedback device, and/or the like.

The system interface 414 may generally provide the primary computing device 320 with an ability to interface with one or more external devices such as, for example, the electronic computing device 310, the elevator controller 315, the at least one secondary computing device 325, and/or the like depicted in FIG. 3. Communication with external devices may occur using various communication ports (not shown). An illustrative communication port may be attached to a communications network.

Figure 4B:
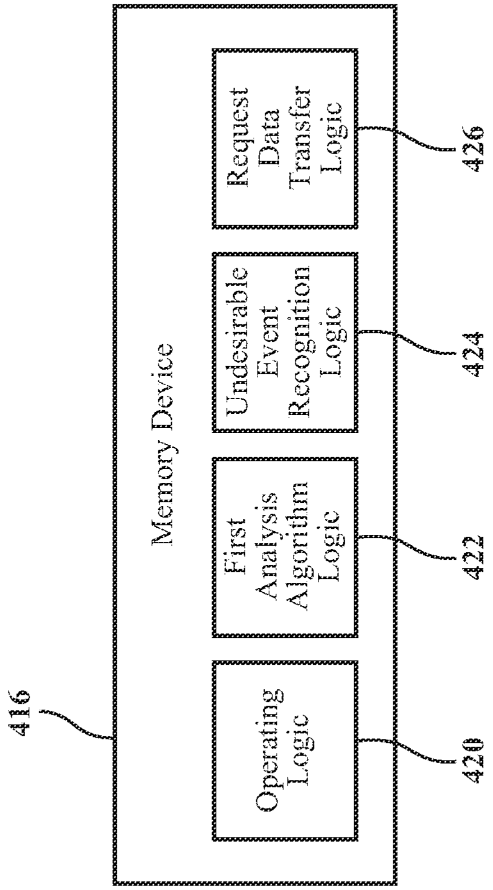
FIG. 4B schematically depicts an illustrative memory component containing illustrative logic components according to one or more embodiments shown and described herein.

With reference to FIG. 4B, in some embodiments, the program instructions contained on the memory device 416 may be embodied as a plurality of software modules, where each module provides programming instructions for completing one or more tasks. For example. FIG. 4B schematically depicts the memory device 416 containing illustrative logic components according to one or more embodiments shown and described herein. As shown in FIG. 4B, the memory device 416 may be configured to store various processing logic, such as, for example, operating logic 420, first analysis algorithm logic 422, undesirable event recognition logic 424, and request data transfer logic 426 (each of which may be embodied as a computer program, firmware, or hardware, as an example). The operating logic 420 may include an operating system and/or other software for managing components of the primary computing device 320. Further, the operating logic 420 may contain one or more software modules for transmitting data, and/or analyzing data.

Still referring to FIG. 4B, the first analysis algorithm logic 422 may contain one or more software modules for analyzing and transforming the received data (e.g., data from the various sensors (FIGS. 1A-2), data from the elevator controller 315 (FIG. 3), combinations thereof, and the like) into the first analyzed data using machine learning techniques, classifying processes, and/or artificial intelligence algorithms such as neural networks, using pattern recognition, classification algorithms regression algorithms, clustering algorithms, ensemble learning algorithms, and the like, to determine whether the determined undesirable event requires the technician to respond. For example, the transformed and analyzed data may be compared to baseline or expected ranges using pattern recognition techniques and when the pattern includes abnormalities, or the patterns are determined to be out of the predetermined range of error values, percentages, deviations, differences, variances, and the like, to recognize when the technician should be alerted or dispatched to respond to the example conveyance systems 1 (FIG. 1A-2) to eliminate false positives and negatives, as discussed herein. Further, on the other hand, when the pattern recognition techniques recognize that the data is not out of the predetermined range or the pattern is not deviating beyond a predetermined error percentage, then the data will continue to be monitored without dispatching the technician, to eliminate false positive dispatching and false negative dispatching, which is common in conventional remote monitoring systems, as discussed herein.

The undesirable event recognition logic 424 may contain one or more software modules for monitoring operational benchmarks in the received data (e.g., data from the various sensors (FIGS. 1A-2), data from the elevator controller 315 (FIG. 3), combinations thereof, and the like) for the example conveyance systems 1 (FIG. 1A-2) to determine when the undesirable event is occurring (e.g., current operational issues or detection of a potential operational issues to occur in the future). Operational issues may include excessive vibration, excessive noise, uneven movement, and the like. Further, baseline or expected range may be used to determine when the received data is greater than a predetermined value or otherwise outside the scope of normal operations.

The request data transfer logic 426 may contain one or more software modules for generating the status data, which may include data related to the dispatch request for the technician, the first analyzed data, and the data indicative of the operating conditions of the conveyance system (e.g., raw data) from the first analysis algorithm logic 422, and the like to one or more external device, such as to the at least one secondary computing device 325, for further analysis, as discussed in greater detail herein.

Still referring to FIGS. 1A-3 and 4B, it should be understood that the operating logic 420, the first analysis algorithm logic 422, the undesirable event recognition logic 424, and the request data transfer logic 426 may simultaneously operate, in real time, and may determine when the undesirable event may be occurring or will occur in the future, determine whether the technician should be dispatched, and the like. As such, the condition for the example conveyance system 1 may be remotely and passively monitored and/or tracked to monitor data related to determining the current operating conditions.

Figure 4C:
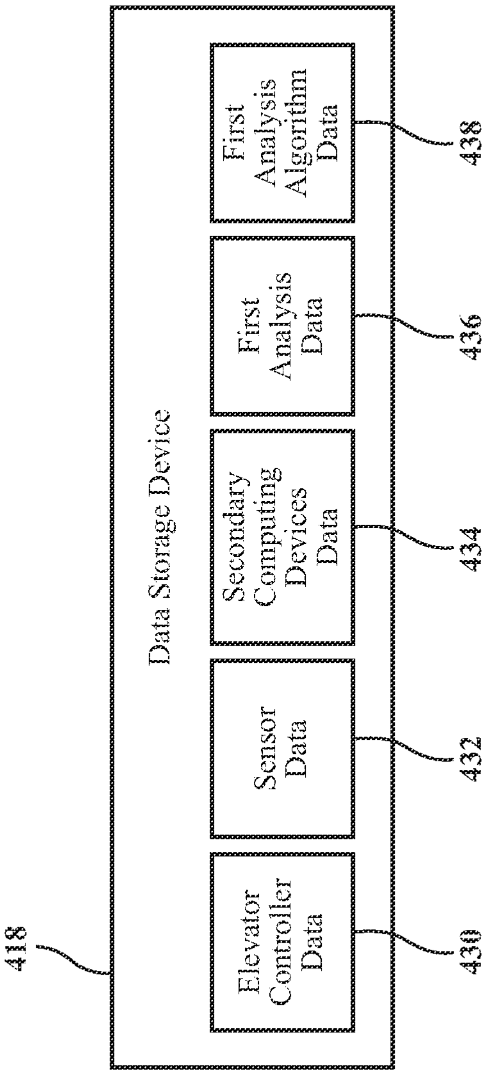
FIG. 4C schematically depicts an illustrative data storage device containing illustrative data components according to one or more embodiments shown and described herein.

FIG. 4C schematically depicts a block diagram of various data contained within a storage device (e.g., the data storage device 418). It should be understood that the data storage device 418 may reside local to and/or remote from the primary computing device 320 and may be configured to store one or more pieces of data for access by the primary computing device 320 and/or other components, to identify when an undesirable event may be occurring and whether the request for the technician should be transmitted to notify the technician of the undesirable event.

As shown in FIG. 4C, the data storage device 418 may include, for example, the elevator controller data 430, such as data related transmitted from the elevator controller 315 (FIG. 3) relating to the current operating conditions of the example conveyance system 1 (FIGS. 1A-2), which may include fault data, data provided from the various sensors to the elevator controller 315 (FIG. 3) and the like.

The data storage device 418 further includes the sensor data 432, such as data directly received from the various sensors of the example conveyance system 1 (FIGS. 1A-2) (e.g., from the plurality of sensors 34, the acceleration sensor 36, the plurality of sensors 34', the acceleration sensor 36', the plurality of sensors 205, the elevator controller 315, and/or the like).

The data storage device 418 further includes the secondary computing devices data, such as data indicative of the number of the at least one secondary computing devices 325 (FIG. 3) connected to the network, the specific identification of those, details on transmitting data to each of the at least one secondary computing devices 325 (FIG. 3), and the like.

The data storage device 418 further includes the first analysis data 436 such as data related to a baseline or expected range that may be used to determine when the received data is greater than a predetermined value or otherwise outside the scope of normal operations. For example, this may be data related to the operations conditions when the example conveyance systems 1 (FIGS. 1A-2) were first installed, or acceptable error values, deviations, differences, percentages, or range of values for the components of and operating conditions of the example conveyance systems 1 (FIGS. 1A-2). Further, the first analysis data 436 may include the storing of the first analyzed data, which is the transformed received data after analysis for transmitting and/or outputting to the external devices such as the at least one secondary computing device 325.

Still referring to FIG. 4C, the data storage device 418 further includes the first analysis algorithm data 438 such as data related to the type of machine learning techniques, classifying processes, and/or artificial intelligence algorithms such as neural networks, using pattern recognition, classification algorithms regression algorithms, clustering algorithms, ensemble learning algorithms, and the like, that are used during the analysis of the raw data to determine whether there is the undesirable event and whether the determined undesirable event requires the technician to respond. Further, the first analysis algorithm data 438 may include rules, models, trained data, and the like to perform the analysis.

As mentioned above, the various components described with respect to FIGS. 4A-4C may be used to carry out one or more processes to improve accuracy of determining undesirable conditions of the example conveyance systems 1 (FIGS. 1-2A) and automatically determining whether the determined undesirable event requires the technician to respond. Further, it should be understood that the components depicted in FIGS. 4A-4C are merely illustrative and are not intended to limit the scope of this disclosure. More specifically, while the components in FIGS. 4A-4C are illustrated as residing within the primary computing device 320, this is a non-limiting example. In some embodiments, one or more of the components may reside external to the primary computing device 320. Similarly, while FIGS. 4A-4C is directed to the primary computing device 320, other components such as the electronic computing device 310, the at least one secondary computing device 325, and/or the elevator controller 315, as depicted in FIG. 3, may include similar hardware, software, and/or firmware.

Figure 5A:
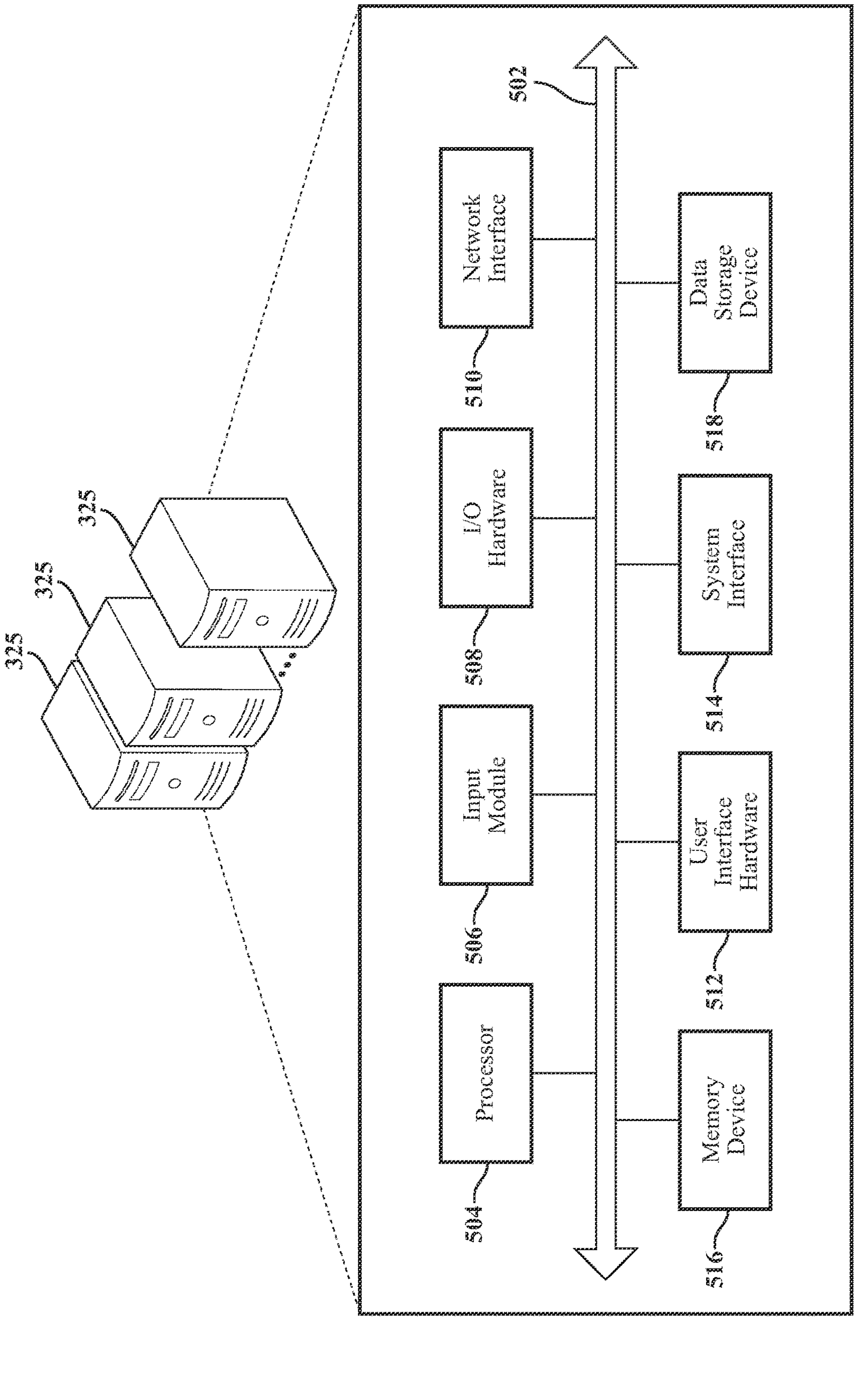
FIG. 5A schematically depicts illustrative hardware and software components of at least one secondary computing device that may be used for determining whether a technician needs to be dispatched according to one or more embodiments described and illustrated herein.

Referring now to FIGS. 1A-3 and 5A, where FIG. 5A depicts the at least one secondary computing device 325, further illustrating the system that monitors and identifies the undesirable event and determines whether a technician needs to be automatically dispatched by utilizing hardware, software, and/or firmware, according to embodiments shown and described herein. The at least one secondary computing device 325 may include a non-transitory, computer readable medium configured for receiving data from various sources (e.g., from the primary computing device 320, directly from the various sensors, from the elevator controller 315, and/or the like), performing the various functions described herein such as those discussed with respect to FIGS. 6-7, providing commands to automatically notify the technician of the undesirable event, providing likely action notifications for repairing the cause of the undesirable event, and/or the like, embodied as hardware, software, and/or firmware, according to embodiments shown and described herein.

While in some embodiments, the at least one secondary computing device 325 may be configured as a general purpose computer with the requisite hardware, software, and/or firmware. In other embodiments, the at least one secondary computing device 325 may be configured as a special purpose computer designed specifically for performing the functionality described herein. For example, the at least one secondary computing device 325 may be a specialized device that particularly receives data from external sources, such as from the primary computing device 320, which may include the status data (e.g., the raw data from the various sensors/elevator controller 315 and/or combinations thereof, fault data from the elevator controller 315, and/or combinations thereof, the first analyzed data indicative of the analysis by the primary computing device 320 and the components thereof, the dispatch request, and the like) and analyzes and transforms some or all of the received data into a second analyzed data.

The at least one secondary computing device 325 applies machine learning techniques, classifying processes, and/or artificial intelligence algorithms such as neural networks and pattern recognition to the raw data to generate the second analyzed data, which is then compared to the result of the first analyzed data from the primary computing device 320, to determine whether the undesirable event occurred (is occurring) and/or whether the technician is actually required to respond to physically act to provide a solution to correct the undesirable event. When determined by the at least one secondary computing device 325 that the comparison of the second first analyzed data is similar or within the predetermined error value, deviation, variance, and the like, the at least one secondary computing device 325 automatically, in an automated process, outputs an alert or warning to the personal communication device 330 to notify the technician to physically act such as to respond to the example conveyance system 1. (FIGS. 1A-2). Additionally, the at least one secondary computing device 325 provides the action recommendations to the personal communication device for the technician on likely causes and repair solutions, as discussed in greater detail herein.

As such, the at least one secondary computing device 325 provides, transmits, and/or outputs the actual alert/notification/request for the technician to an external component (e.g., the personal communication device 330 for the purposes of improving the accuracy of passively monitoring the conveyance systems 1 (FIGS. 1-2A), recognizing and confirming the undesirable event occurred and/or is likely to occur, and determining whether there should be an actual request for the technician to be physically involved in the repair solution (e.g., a physical action by the technician may be a repair, a transmission of software, replacement of components, observation of operating standards or conditions, and the like), to eliminate false positive dispatches and false negative dispatches, as discussed in greater detail herein.

As also illustrated in FIG. 5A, in other embodiments, the at least one secondary computing device 325 may include a processor 504, input module 506, I/O) hardware 508, network interface hardware 510, user interface hardware 512, a system interface 514, a data storage device 518, which stores a database of monitoring data 540, first analysis data 432, priority data 544, second analysis algorithm data 546, comparison data 548, notification and alert data 550, cause of undesirable event data 552, action recommendation data 554, and a memory device 516. The memory device 516 may be non-transitory computer readable memory. The memory device 516 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory device 516 may be configured to store operating logic 520, prioritize logic 522, second analysis algorithm logic 524, comparison logic 526, action recommendation logic 528, and dispatch/alert logic 530 (each of which may be embodied as a computer program, firmware, or hardware, as an example). A local interface 502 is also included in FIG. 5A and may be implemented as a bus or other interface to facilitate communication among the components of the at least one secondary computing device 325.

The processor 504, such as a computer processing unit (CPU), may be the central processing unit of the at least one secondary computing device 325, performing calculations and logic operations to execute a program. The processor 504, alone or in conjunction with the other components, is an illustrative processing device, computing device, electronic control unit, or combination thereof. The processor 504 may include any processing component configured to receive and execute instructions (such as from the data storage device 518 and/or the memory device 516).

Still referring to FIG. 5A, the input module 506 may include tactile input hardware (i.e. a joystick, a keyboard, a mouse, a knob, a lever, a button, and/or the like) that allows the user to directly input settings. The I/O hardware 508 may communicate information between the local interface 502 and one or more other components of the illustrative monitoring and dispatching system 300 (FIG. 3). For example, the I/O) hardware 508 may act as an interface between the at least one secondary computing device 325 and other components, such as the electronic computing device 310, the primary computing device 320, and/or the like. In some embodiments, the I/O) hardware 508 may be utilized to transmit one or more commands to the other components of the illustrative monitoring and dispatching system 300 (FIG. 3).

Still referring to FIG. 5A, the network interface hardware 510 may include any wired or wireless networking hardware, such as a modem, a LAN port, a wireless fidelity (Wi-Fi) card. WiMax card, mobile communications hardware, and/or other hardware for communicating with other networks and/or devices. For example, the network interface hardware 510 may provide a communications link between the at least one secondary computing device 325 and the other components of the illustrative monitoring and dispatching system 300 (FIG. 3) depicted in FIG. 3, including, but not limited to, the electronic computing device 310, the elevator controller 315, the primary computing device 320, and/or the like, as depicted in FIG. 3.

The user interface hardware 512 may permit information from the local interface 502 to be provided to the user, whether the user is local to the at least one secondary computing device 325 or remote from the at least one secondary computing device 325 (e.g., a user of the electronic computing device 310 (FIG. 3)). Still referring to FIG. 5A, the user interface hardware 512 may incorporate a display and/or one or more input devices such that information is displayed on the display in audio, visual, graphic, or alphanumeric format and/or receive inputs. Illustrative input devices include, but are not limited to, the devices discussed with respect to the input module 506, a keyboard, a touch screen, a remote control, a pointing device, a video input device, an audio input device, a haptic feedback device, and/or the like.

The system interface 514 may generally provide the at least one secondary computing device 325 with an ability to interface with one or more external devices such as, for example, the electronic computing device 310, the elevator controller 315, the primary computing device 320, and/or the like depicted in FIG. 3. Communication with external devices may occur using various communication ports (not shown). An illustrative communication port may be attached to a communications network.

Figure 5B:
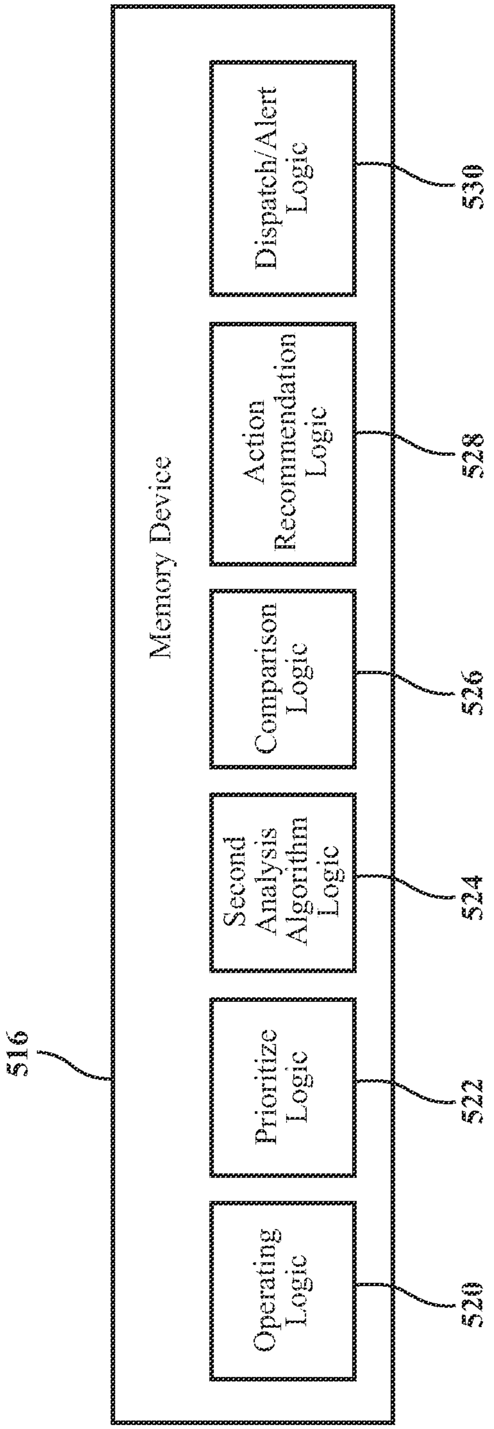
FIG. 5B schematically depicts an illustrative memory component containing illustrative logic components according to one or more embodiments shown and described herein.

With reference to FIG. 5B, in some embodiments, the program instructions contained on the memory device 516 may be embodied as a plurality of software modules, where each module provides programming instructions for completing one or more tasks. For example, FIG. 5B schematically depicts the memory device 516 containing illustrative logic components according to one or more embodiments shown and described herein. As shown in FIG. 5B, the memory device 516 may be configured to store various processing logic, such as, for example, operating logic 520, prioritize logic 522, second analysis algorithm logic 524, comparison logic 526, action recommendation logic 528, and dispatch/alert logic 530 (each of which may be embodied as a computer program, firmware, or hardware, as an example). The operating logic 520 may contain one or more software modules for an operating system and/or other software for managing components of the at least one secondary computing device 325. Further, the operating logic 520 may contain one or more software modules for transmitting data, and/or analyzing data.

Still referring to FIG. 5B, the prioritize logic 522 may contain one or more software modules for determining a priority of the example conveyance system 1 (FIGS. 1A-2), such as whether the conveyance equipment is determined to be priority use conveyance system (e.g., manufacturing environments, type of building, whether there is only one conveyance system in a senior center, and the like). As such, the prioritize logic 522 may override the hold of the technician request determined by the analysis of the second analyzed data by the at least one secondary computing device 325 when the example conveyance system 1 (FIGS. 1A-2) is a priority and instruct components of the at least one secondary computing device (e.g., the dispatch/alert logic 530) to send the alert/notification/warning to either the personal communication device 330 (FIG. 3) and/or to a different external device. As such, the priority may be set by the type of maintenance agreement where added costs are charged for each technician visit regardless of the undesirable event occurrence. In this case, the prioritize logic 522 may work with other components of the at least one secondary computing device 325 (e.g., other logic modules such as the dispatch/alert logic 530 and the components of the data storage device 518) to alert or notify third party personnel other than the technician or in lieu of alerting the technician.

In a non-limiting example, the prioritize logic 522 may override the hold of the technician request discussed above where a false negative can be undesirable. For example, in case one, when there is a high-profile service contract with a key account, if the technician is sent and there is nothing wrong, then there are minimal lost costs associated. However, not sending the technician and there is a failure may cost the client or account. As another non-limiting example, in case two, when there is an agreement that only periodic service is to be performed (i.e., a monthly service) and anything additional is at an extra cost, and thus must be authorized in advance, if the technician is sent to make a repair, the client may refuse to pay for such services because there was not a previous authorization. As such, this is an undesirable result and the prioritize logic 522 may, in some embodiments, hold the alert such that the technician is not dispatched to prevent such undesirable results.

On the other hand, in a non-limiting example, the prioritize logic 522 may override the hold based on other factors such as a size of contract, age of contract, number of conveyance systems in a building, building occupancy, type of building (e.g., healthcare, senior living facility, and the like), next scheduled maintenance visit, and the like.

The second analysis algorithm logic 524 may contain one or more software modules for analyzing and transforming the received data (e.g., data from the primary computing device 320, data from various sensors (FIGS. 1A-2), data from the elevator controller 315 (FIG. 3), combinations thereof, and the like) into the second analyzed data using machine learning techniques, classifying processes, and/or artificial intelligence algorithms such as neural networks, using pattern recognition, classification algorithms, regression algorithms, clustering algorithms, ensemble learning algorithms, and the like, to determine whether the determined undesirable event requires the technician to respond. For example, the transformed and analyzed second data may be compared to a baseline or expected ranges using pattern recognition techniques and when the pattern includes abnormalities, or the patterns are determined to be out of the predetermined range of error percentages, to recognize when the technician should be alerted or dispatched to respond to the example conveyance systems 1 (FIGS. 1A-2) to eliminate false positives and negatives, as discussed herein. Further, on the other hand, when the pattern recognition techniques recognize that the data is not out of the predetermined range or the pattern is not deviating beyond a predetermined error percentage, then the data will continue to be monitored without dispatching the technician, to eliminate false positives and negatives, as discussed herein.

The comparison logic 526 may contain one or more software modules for comparing the first analyzed data generated by and received from the primary computing device 320 (FIG. 3) and the second analyzed data generated by the at least one secondary computing device 325 indicative of the current operating condition of the example conveyance systems 1 (FIGS. 1A-2) and the individual components thereof, to compare the generated data from each of the primary computing device 320 (FIG. 3) and the at least one secondary computing device 325. The comparison logic 526 may include and/or use a lookup table, machine learning algorithms, artificial intelligence algorithms, and/or the like, that establishes a correlation or comparison between a baseline variance or desirable variance between the first analyzed data and the second analyzed data and a current calculated or determined first analyzed data and second analyzed data. The comparison logic 526 may perform calculations to determine whether the differences, variances, deviations, errors, and the like, in the various data calculations (e.g., comparing analyzed data between the primary computing device 320 and the at least one secondary computing device 325) are with the desirable predetermined error values, differences, variances, deviations, and the like. The comparison logic 526 may inhibit a notification or alert to the technician based on the results of the comparisons. For example, if the results are inconsistent (i.e., the values are not within the predetermined error value, variances, differences, deviations, percentages, and the like), the comparison logic 526 may inhibit other components (e.g., the dispatch/alert logic 530) of the at least one secondary computing device 325 from alerting the technician and may instead place the technician request on hold by storing the request in the data storage device 518, while also requesting the primary computing device 320 (FIG. 3) to continue to acquire data and performing the analysis, transmitting the data and analysis to the at least one secondary computing device 325.

As such, when there is not a consensus or agreement between the primary computing device 320 (FIG. 3) and the at least one secondary computing device 325, rather than not creating an alert to send the technician when needed or sending the technician when there is not the undesirable event requiring the technician to perform some type of intervention, the comparison logic 526 continues to evaluate the plurality of incoming data until the comparison is within the desired predetermined error value (e.g., the variance, difference, deviation, and the like) resulting in a desirable alert/notification to the technician. As such, dispatching the technician automatically when the example conveyance system 1 (FIG. 1A-2) is functioning properly is undesirable (e.g., a false positive consequence) and if the technician is not dispatched when the conveyance system 1 (FIG. 1A-2) is not functioning properly is also undesirable (e.g., a false negative consequence) results in undesirable consequences that are experience, results in lower customer satisfaction, and the like. The comparison logic 526 and other components of the at least one secondary computing device 325 reduce and/or eliminate the undesirable consequences discussed herein.

The action recommendation logic 528 may contain one or more software modules for generating a recommendation on how to best resolve the root cause of the undesirable event. That is, the action recommendation logic 528 provides automated instructions, manuals, potential root causes, and the like, associated with the undesirable event to solve the root cause of the undesirable event causing the operational issue of the example conveyance systems 1 (FIGS. 1A-2). For example, the root cause may be a firmware related repair, a component failure, and the like, that would be pushed to the personal communication device 330 (FIG. 3) to alert or notify the technician of the recommendation.

The dispatch/alert logic 530 may contain one or more software modules for generating an alert when the comparison between the generated data by the primary computing device 320 (FIG. 3) and the at least one secondary computing device 325 are determined to be within a predetermined error value or correlation with one another indicating that the results are genuine and accurate. As such, the dispatch/alert logic 530 may push alerts, notifications and the like to the personal communication device 330. The alert may be an audio alert, such as an audible sound, a text alert, such as a push notification warning on the display 335 of the personal communication device 330 (FIG. 3), a command to the elevator controller 315 (FIG. 3) to inhibit movement of the example conveyance systems 1 (FIGS. 1A-2), a combination thereof, and/or the like. The alert may be preselected from a plurality of alert types.

Still referring to FIGS. 1A-3 and 5B, it should be understood that the operating logic 520, prioritize logic 522, second analysis algorithm logic 524, comparison logic 526, action recommendation logic 528, and dispatch/alert logic 530 may simultaneously operate, in real time, and may operate with the operating logic 420, the first analysis algorithm logic 422, the undesirable event recognition logic 424, and the request data transfer logic 426 of the primary computing device 320 (FIG. 3) to determine when the undesirable event may be occurring or will occur in the future, determine whether the technician should be dispatched, and the like. As such, the condition for the example conveyance system 1 may be remotely and passively monitored and/or tracked to monitor data related to determining the current operating conditions.

Figure 5C:
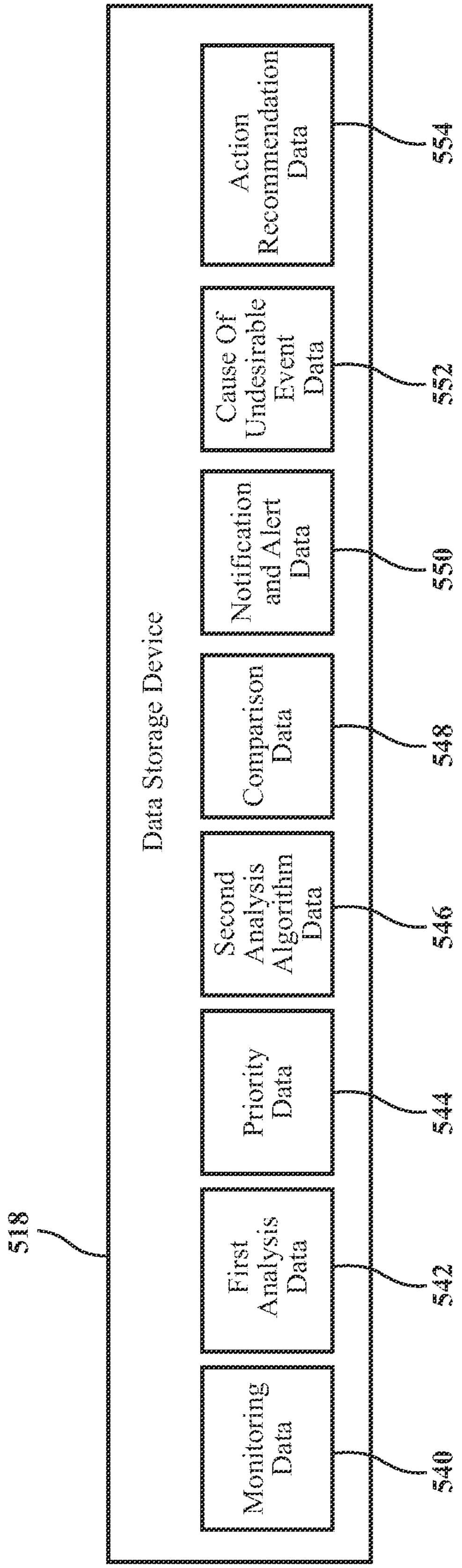
FIG. 5C schematically depicts an illustrative data storage device containing illustrative data components according to one or more embodiments shown and described herein.

FIG. 5C schematically depicts a block diagram of various data contained within a storage device (e.g., the data storage device 518). It should be understood that the data storage device 518 may reside local to and/or remote from the at least one secondary computing device 325 and may be configured to store one or more pieces of data for access by the at least one secondary computing device 325 and/or other components, to identify when an undesirable event may be occurring and whether the request for the technician should be transmitted to alert the technician of the undesirable event.

As shown in FIG. 5C, the data storage device 518 may include, for example, the monitoring data 540, such as the data transmitted from the primary computing device 320 (FIG. 3) and related to data transmitted from the elevator controller 315 (FIG. 3) relating to the current operating conditions of the example conveyance system 1 (FIGS. 1A-2), which may include fault data, data provided from the various sensors to the elevator controller 315 (FIG. 3) and the like. As such the monitoring data 540 may further include the data related to the various sensors, such as data directly received from the various sensors of the example conveyance system 1 (FIGS. 1A-2) (e.g., from the plurality of sensors 34, the acceleration sensor 36, the plurality of sensors 34', the acceleration sensor 36', the plurality of sensors 205, the elevator controller 315, and/or the like).

The data storage device 518 further includes the first analysis data 542 such as the stored data provided by the primary computing device 320 (FIG. 3) related to the analysis of the first analyzed data generated by the primary computing device 320 (FIG. 3) using the various machine learning techniques, classifying processes, and/or artificial intelligence algorithms such as neural networks, using pattern recognition, classification algorithms, regression algorithms, clustering algorithms, ensemble learning algorithms, and the like, that are used during the analysis of the raw data to determine whether there is the undesirable event and whether the determined undesirable event requires the technician to respond. Further, the first analysis data 542 includes data related to the type of various machine learning techniques, classifying processes, and/or artificial intelligence algorithms used to analyze the raw data by the primary computing device 320 (FIG. 3).

The data storage device 518 further includes the priority data 544 such as data related to a predetermined priority classification for the example conveyance system 1 (FIGS. 1A-2), such as whether the conveyance equipment is predetermined to be priority use conveyance system (e.g., conveyance system in manufacturing environments, the only conveyance system in a building such as in a senior center, and the like). As such, the priority data 544 may store data related as to whether the analysis of data generated from the example conveyance system 1 (FIGS. 1A-2) may be treated differently based on whether the example conveyance system 1 (FIGS. 1A-2) is determined to be a priority system. Further, there may be various tiers or levels related to the priority that may influence or change whether the technician is alerted or dispatched to the example conveyance system 1 (FIGS. 1A-2). As such, the priority data 544 may include data related to the tiers or levels based on the type of maintenance agreement where added costs are charged for each technician visit regardless of the undesirable event occurrence such that the most stringent deviation (e.g., allowed error values or deviations between the comparison of data between the primary computing device 320 (FIG. 3) and the at least one secondary computing device 325) is in one tier and more relaxed deviations are in other based on the predetermined priority requirements.

The data storage device 518 further includes the second analysis algorithm data 546 such as data related to the type of machine learning techniques, classifying processes, and/or artificial intelligence algorithms such as neural networks, using pattern recognition, classification algorithms, regression algorithms, clustering algorithms, ensemble learning algorithms, and the like, that are used during the analysis of the raw data provided by the primary computing device 320 (FIG. 3) to determine whether there is the undesirable event and whether the determined undesirable event requires the technician to respond. Further, the second analysis algorithm data 546 may include rules, models, trained data, and the like to perform the analysis. Additionally, the second analysis algorithm data 546 may provide to the components of the memory device 516 the various algorithms to use to differentiate from the machine learning techniques, classifying processes, and/or artificial intelligence algorithms used to analyze the raw data by the primary computing device 320 (FIG. 3).

Still referring to FIG. 5C, the data storage device 518 further includes the comparison data 548 such as data related to the lookup table, the predetermined deviations, differences, variances, and/or error values, and the like. The comparison data 548 may further include data related to the desired calculations based on the various components of the example conveyance systems 1 (FIGS. 1A-2), and data related to whether differences, deviations, variances, or errors in the various data calculations (e.g., from the primary computing device 320 and the at least one secondary computing device 325) are with the desirable predetermined error value.

The data storage device 518 further includes the notification and alert data 550 such as data related to the notification and alert to the personal communication device 330 (FIG. 3). Further, the notification and alert data 550 may include different predetermined or user customized alerts based on the determined undesirable event. For example, the notification and alert data 550 may include data related to various output fault states. For instance, the notification and alert data 550 may be populated with data related to one level or output state when there is an impending failure of the example conveyance system 1 (FIGS. 1A-2) and a different level or output when the determination is that the example conveyance system 1 (FIGS. 1A-2) is not operating.

Still referring to FIG. 5C, the data storage device 518 further includes the cause of undesirable event data 552, which includes data related to most likely root cause of the determined undesirable event. As such, based on various received data, the root cause of the undesirable may be determined and the most probably or likely repairs may be transmitted to the technician, as discussed in greater detail herein.

The data storage device 518 further includes the action recommendation data 554, which includes data related to notifications that may pushed to the personal communication device 330 that includes information for the technician regarding the most likely cause of the undesirable event and/or repair recommendations (e.g., instructions, potential components to check, and the like).

As mentioned above, the various components described with respect to FIGS. 5A-5C may be used to carry out one or more processes to improve accuracy of determining undesirable conditions of the example conveyance systems 1 (FIGS. 1-2A) and automatically determining whether the determined undesirable event requires the technician to respond. Further, it should be understood that the components depicted in FIGS. 5A-5C are merely illustrative and are not intended to limit the scope of this disclosure. More specifically, while the components in FIGS. 5A-5C are illustrated as residing within the at least one secondary computing device 325, this is a non-limiting example. In some embodiments, one or more of the components may reside external to the at least one secondary computing device 325. Similarly, while FIGS. 5A-5C is directed to the at least one secondary computing device 325, other components such as the electronic computing device 310, the primary computing device 320, and/or the elevator controller 315, as depicted in FIG. 3, may include similar hardware, software, and/or firmware.

Figure 6:
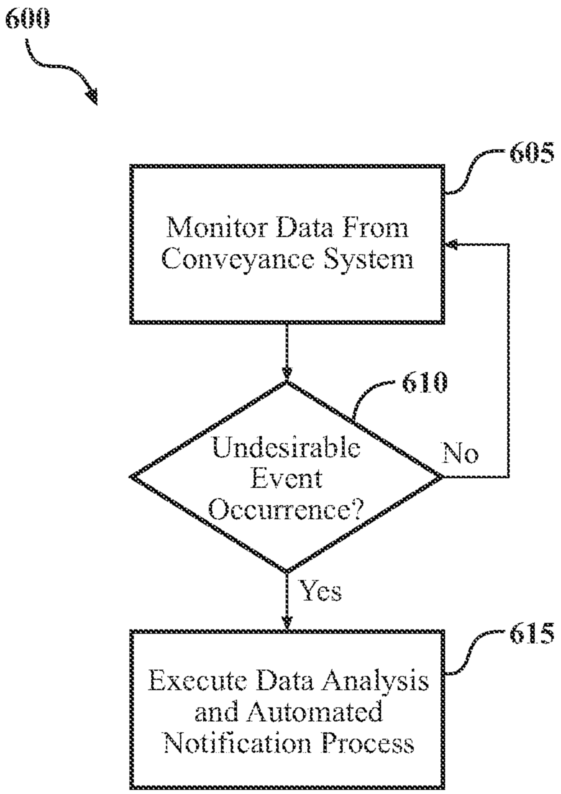
FIG. 6 depicts a flow diagram of an illustrative method for determining whether an event analysis is required according to one or more embodiments shown and described herein.

Referring back to FIGS. 1A-5C and now also to FIG. 6, a flow diagram that graphically depicts an illustrative method 600 of determining whether an event analysis is required is provided. Although the steps associated with the blocks of FIG. 6 will be described as being separate tasks, in other embodiments, the blocks may be combined or omitted. Further, while the steps associated with the blocks of FIG. 6 will be described as being performed in a particular order, in other embodiments, the steps may be performed in a different order.

At block 605, data from the conveyance system 1 is transmitted to the primary computing device 320 for monitoring. The data may be received directly from the elevator controller that may include a plurality of fault data, data from the various sensors (e.g., from the plurality of sensors 34, the acceleration sensor 36, the plurality of sensors 34', the acceleration sensor 36', the plurality of sensors 205, the elevator controller 315, and/or the like), and the like, or may be data directly from the various sensors (e.g., from the plurality of sensors 34, the acceleration sensor 36, the plurality of sensors 34', the acceleration sensor 36', the plurality of sensors 205, the elevator controller 315, and/or the like), and/or combinations of data provided by the elevator controller 315 and directly from the various sensors.

At block 610, the data is analyzed to determine whether an undesirable event is or has occurred. The undesirable event of the example conveyance systems 1 may be a failure of a part or component of the example conveyance system 1 that does not stop the example conveyance system 1 from operating and/or a predicted or expected failure when a part or component of the example conveyance system 1 is determined to be in a pre-failure state or an imminent failure state, but has not yet failed. Examples may be wear parts or components, preventative maintenance parts and components, and/or monitoring of these components leads to trends or data that illustrates the need to replace or repair a part or component prior to failure. Other examples of undesirable events include a stop in the operating condition of the example conveyance system 1.

If, at block 610, the undesirable event has not occurred or is not yet occurring, the method 600 returns to block 605 to continue to gather and monitor data from the example conveyance system 1. On the other hand, if, at block 610, it is determined that the undesirable event has occurred or is occurring, the method 600 proceeds to block 615, to execute the data analysis and automated notification process.

Figure 7:
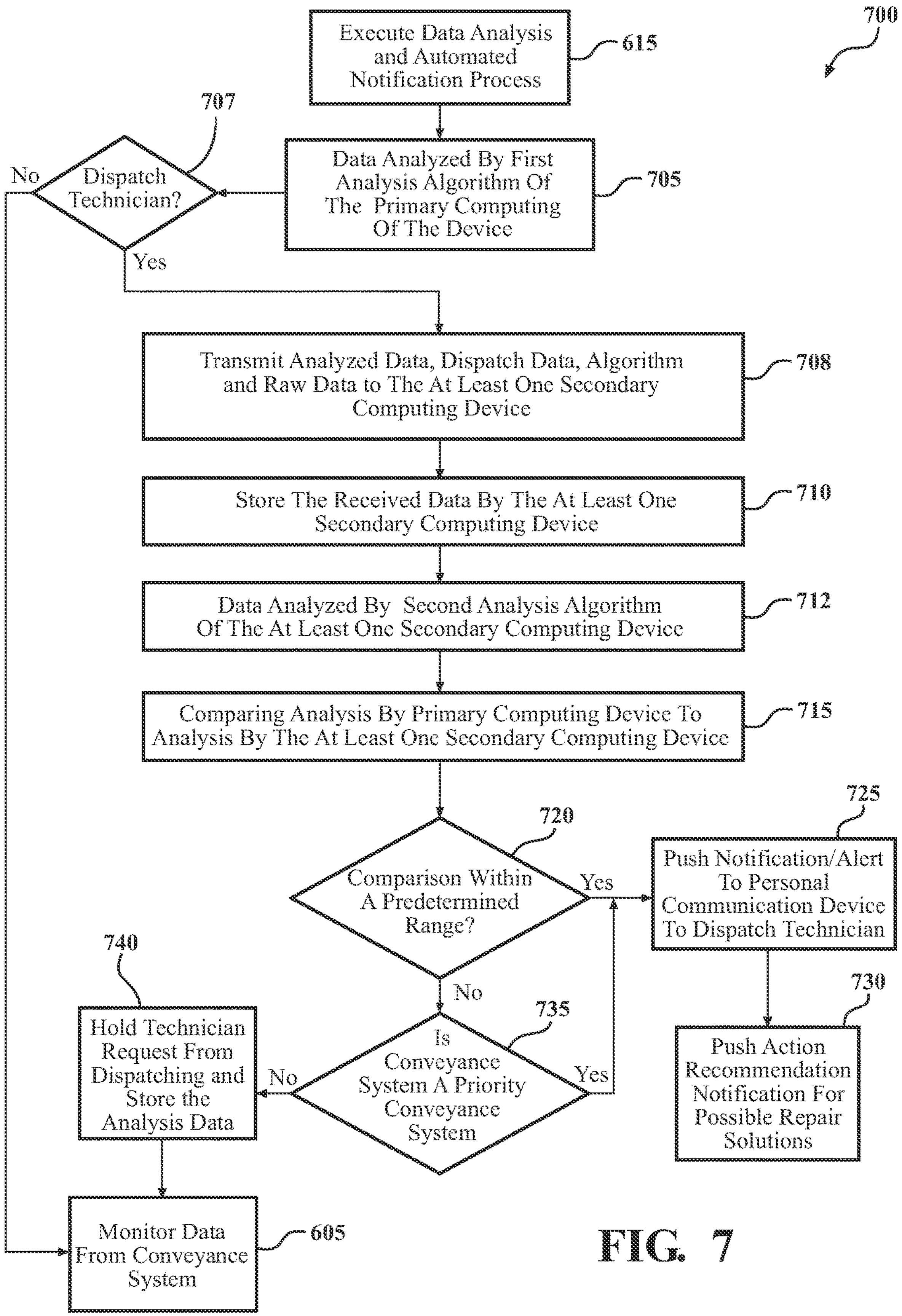
FIG. 7 depicts a flow diagram of an illustrative method for executing a data analysis and automated notification process according to one or more embodiments shown and described herein.

Still referring to FIGS. 1A-SC and now also to FIG. 7, a flow diagram that graphically depicts an illustrative method 700 for executing the data analysis and automated notification process. Although the steps associated with the blocks of FIG. 7 will be described as being separate tasks, in other embodiments, the blocks may be combined or omitted. Further, while the steps associated with the blocks of FIG. 7 will be described as being performed in a particular order, in other embodiments, the steps may be performed in a different order.

At block 705, the received data is analyzed by the primary computing device 320 using a first analysis algorithm (e.g., applying machine learning techniques, classifying processes, and/or artificial intelligence algorithms such as neural networks and pattern recognition). A determination is made based on the results of the analysis whether to dispatch the technician, at block 707. If the analysis by the first analysis algorithm of the primary computing device 320 does not result in the need to dispatch the technician, the method 700 ends, and the data from the conveyance system 1 is transmitted to the primary computing device 320 for monitoring, at block 605, as described with respect to the method 600.

On the other hand, if, at block 707, the analysis of the received data by the first analysis algorithm of the primary computing device 320 results in a dispatch of the technician, then at block 708, status data is transmitted or output by the primary computing device 320 to the at least one secondary computing device 325. The status data may include the received data, the first analyzed data resulting from the analysis, the technician request, and any other pertinent data such as the algorithm used, the identification of the example conveyance system 1, and the like. As such, the at least one secondary computing device 325 only receives data relating to the example conveyance system 1 when the undesirable event has occurred and the primary computing device 320 has analyzed the data to determine the undesirable event requires the technician to remedy. As such, the method 700 limits the amount of data collected and transmitted resulting in less traffic and processing required, less data that needs to be analyzed, reducing the number of errors such as false negatives and false positives as discussed in greater detail herein.

At block 710, the status data, such as the received data, the first analyzed data resulting from the analysis, the technician request, and any other pertinent data is stored by the at least one secondary computing device and, at block 712, the status data is analyzed by the at least one secondary computing device 325 using a second analysis algorithm (e.g., applying machine learning techniques, classifying processes, and/or artificial intelligence algorithms such as neural networks and pattern recognition). The second analysis algorithm is different from the first analysis algorithm. Further, it should be understood that the multiple different algorithms may be used by multiple secondary computing devices.

At block 715, the technician dispatch data resulting from the first analyzed data based on the first data generated by first analysis algorithm of the primary computing device 320 is compared to the analysis results performed by the second analysis algorithm of the at least one secondary computing device 325 (e.g., second analyzed data). If the comparison between the two results is within a predetermined value, difference, deviation, variance, error, and the like, at block 720, then the data is deemed trustworthy and the at least one secondary computing device 325 pushes a notification/alert/warning to the personal communication device 330 to actively dispatch the technician, at block 725. Further, at block 730, the at least one secondary computing device 325 pushes an action recommendation notification that provides potential root causes of the undesirable event and potential repair solutions. In some embodiments, the technician is required to acknowledge the notification/alert/warning on the personal communication device 330 by actively confirming the notification/alert/warning on the personal communication device 330.

On the other hand, if the comparison between the two results is outside a predetermined desired rage or is below or exceeds a predetermined value, difference, deviation, variance, error, and the like, at block 720, then the data is deemed not trustworthy and the at least one secondary computing device 325 determines whether the example conveyance system 1 is a priority conveyance system, at block 735. If the example conveyance system is not a priority conveyance system, then, at block 740, the at least one secondary computing device 325 holds the technician request from dispatching and stores the data, and the method 700 proceeds back to block 615 for the primary computing device 320 to continue to monitor data from the example conveyance system 1.

If, at block 735, the determination is that the example conveyance system 1 is a priority conveyance system, then, regardless of the comparison results, at block 720, the at least one secondary computing device 325 pushes the notification/alert to the personal communication device 330 to actively dispatch the technician, at block 725, and pushes the action recommendation notification that provides potential root causes of the undesirable event and potential repair solutions.

It should be understood that the methods 600 and 700 described herein may be simultaneously evaluating the undesired event and determining whether to automatically dispatch the technician to the example conveyance system. Further, the methods 600 and 700 may continuously and iteratively run.

Embodiments of the present disclosure are directed to improved systems and methods to monitor and identify whether conveyance systems and components thereof require an automated dispatch to a technician for an actual preventative maintenance or failure of a component of the conveyance system using artificial intelligence and without the need for human intervention.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for monitoring operating conditions of a conveyance system, the system comprising:
- a primary computing device communicatively coupled to the conveyance system;
- at least one secondary computing device communicatively coupled to the primary computing device; and
- a personal communication device communicatively coupled to the at least one secondary computing device;
- the primary computing device having a first processing device configured to:
  - receive a data indicative of the operating conditions of the conveyance system,
  - determine that an undesirable event is occurring based on the received data,
  - perform a data analysis using a first algorithm to generate a first analyzed data indicative of the operating conditions of the conveyance system after analysis by the first algorithm,
  - determine whether a dispatch request for a physical action is required, and
  - when the dispatch request for the physical action is required, transmit a status data to the at least one secondary computing device;
- the at least one secondary computing device having a second processing device configured to:
  - receive the status data,
  - perform a data analysis of the status data using a second algorithm to generate a second analyzed data indicative of the operating conditions of the conveyance system, the second algorithm is different from the first algorithm;
  - compare the second analyzed data with the first analyzed data, and
  - when the comparison between the second analyzed data and the first analyzed data is within a predetermined error value range, determine that a technician is required for a conveyance system maintenance requirement to correct the undesirable event currently occurring with the conveyance system.

2. The system of claim 1, wherein the conveyance system further comprising:
- a controller communicatively coupled to the primary computing device; and
- a plurality of sensors communicatively coupled to the controller,
- wherein the data received indicative of the operating conditions of the conveyance system is transmitted from the controller of the conveyance system.

3. The system of claim 2, wherein the data transmitted from the controller is a fault data or a sensor data from at least one of the plurality of sensors, or a combination of the fault data and the sensor data from at least one of the plurality of sensors.

4. The system of claim 1, wherein the conveyance system further comprising:
- a plurality of sensors communicatively coupled to the primary computing device,
- wherein the data received indicative of the operating conditions of the conveyance system is transmitted from at least one of the plurality of sensors.

5. The system of claim 1, wherein the second processing device is further configured to:
- when the comparison between the second analyzed data and the first analyzed data is within the predetermined error value range, transmit the dispatch request to the personal communication device as an alert that the conveyance system requires the physical action and to actively dispatch a technician in response the technician the physical action; and
- when the comparison between the second analyzed data and the first analyzed data is outside of the predetermined error value range, determine whether the conveyance system is a priority conveyance system.

6. The system of claim 5, wherein the second processing device is further configured to:
- when the conveyance system is determined to be the priority conveyance system, transmit the dispatch request to the personal communication device as an alert that the conveyance system requires the physical action and to physically dispatch the technician.

7. The system of claim 1, wherein the status data includes the dispatch request, the first analyzed data, and the data indicative of the operating conditions of the conveyance system.

8. The system of claim 1, wherein when the dispatch request is transmitted to the personal communication device, transmit an action recommendation notification to the personal communication device.

9. The system of claim 8, wherein the action recommendation notification includes an automated recommendation for a solution to a root cause of the undesirable event.

10. A method for physically dispatching a technician to a conveyance system, the method comprising:
- receiving, by a primary computing device, a data indicative of operating conditions of the conveyance system;
- determining, by the primary computing device, that an undesirable event is occurring based on the received data indicative of operating conditions of the conveyance system;
- performing, by the primary computing device, a data analysis using a first algorithm to generate a first analyzed data indicative of operating conditions of the conveyance system after analysis by the first algorithm;
- determining, by the primary computing device, whether a dispatch request for a physical action is required;
- when the dispatch request for the physical action is required, transmit, by the primary computing device, a status data to at least one secondary computing device;
- performing, by the at least one secondary computing device, a data analysis of the status data using a second algorithm to generate a second analyzed data indicative of operating conditions of the conveyance system after analysis by the second algorithm, the second algorithm is different from the first algorithm;
- comparing, by the at least one secondary computing device, the second analyzed data with the first analyzed data; and
- when the comparison between the second analyzed data and the first analyzed data is within a predetermined error value range, determining that the technician is required for a conveyance system maintenance requirement to correct the undesirable event currently occurring with the conveyance system.

11. The method of claim 10, wherein the conveyance system further comprising:

a controller communicatively coupled to the primary computing device; and a plurality of sensors communicatively coupled to the controller, wherein the data received indicative of operating conditions of the conveyance system is transmitted from the controller of the conveyance system.

12. The method of claim 11, wherein the data transmitted from the controller is a fault data or a sensor data from at least one of the plurality of sensors or a combination of the fault data and the sensor data.

13. The method of claim 10, wherein the conveyance system further comprising:

a plurality of sensors communicatively coupled to the primary computing device, wherein the data received indicative of operating conditions of the conveyance system is transmitted from at least one of the plurality of sensors.

14. The method of claim 10, wherein the status data includes the dispatch request, the first analyzed data, and the data indicative of operating conditions of the conveyance system.

15. The method of claim 10, further comprising the steps of:

when the dispatch request is transmitted to the personal communication device, transmitting, by the at least one secondary computing device, an action recommendation notification to the personal communication device.

16. The method of claim 15, wherein the action recommendation notification includes an automated recommendation for a solution to a root cause of the undesirable event.

17. The method of claim 10, further comprising the steps of:

when the comparison between the second analyzed data and the first analyzed data is within the predetermined error value range, transmitting by the at least one secondary computing device, the dispatch request to a personal communication device as an alert that the conveyance system requires the physical action and to physically dispatch the technician; and when the comparison between the second analyzed data and the first analyzed data is outside of the predetermined error value range, determining, by the at least one secondary computing device, whether the conveyance system is a priority conveyance system.

18. The method of claim 17, further comprising the steps of:

when the conveyance system is determined to be the priority conveyance system, transmitting, by the at least one secondary computing device, the dispatch request to the personal communication device as an alert that the conveyance system requires the physical action and to physically dispatch the technician.

19. A system for monitoring a plurality of operating conditions for a plurality of components of a conveyance system, the system comprising:

a primary computing device communicatively coupled to the conveyance system;

at least one secondary computing device communicatively coupled to the primary computing device; and a personal communication device communicatively coupled to the at least one secondary computing device;

the primary computing device configured to:

receive a data indicative of operating conditions of the conveyance system, determine that an undesirable event is occurring, perform a data analysis using a first algorithm to generate a first analyzed data, determine whether a dispatch request for a physical action is required, and when the dispatch request for the physical action is required, transmit a status data to the at least one secondary computing device;

the at least one secondary computing device configured to:

receive the status data, perform a data analysis of the status data using a second algorithm to generate a second analyzed data, the second algorithm is different from the first algorithm;

compare the second analyzed data with the first analyzed data, and when the comparison between the second analyzed data and the first analyzed data is within a predetermined error value range, determine that a technician is required for a conveyance system maintenance requirement to correct the undesirable event currently occurring with the conveyance system.

20. The system of claim 19, wherein the at least one secondary computing device is further configured to:

when the comparison between the second analyzed data and the first analyzed data is within the predetermined error value range, transmit the dispatch request to a personal communication device as an alert that the conveyance system requires the physical action and to physically dispatch the technician;

when the comparison between the second analyzed data and the first analyzed data is outside of the predetermined error value range, determine whether the conveyance system is a priority conveyance system; and when the conveyance system is determined to be the priority conveyance system, transmit the dispatch request to the personal communication device as an alert that the conveyance system requires the physical action and to physically dispatch the technician.

* * * * *